US011492111B2

(12) United States Patent
Adachi

(10) Patent No.: US 11,492,111 B2
(45) Date of Patent: Nov. 8, 2022

(54) REPLENISHMENT PLANNING DEVICE AND REPLENISHMENT PLANNING METHOD

(71) Applicant: YAMAHA HATSUDOKI KABUSHIKI KAISHA, Iwata (JP)

(72) Inventor: Hajime Adachi, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 371 days.

(21) Appl. No.: 16/648,721

(22) PCT Filed: Apr. 27, 2018

(86) PCT No.: PCT/JP2018/017344
§ 371 (c)(1),
(2) Date: Mar. 19, 2020

(87) PCT Pub. No.: WO2019/058623
PCT Pub. Date: Mar. 28, 2019

(65) Prior Publication Data
US 2020/0269979 A1 Aug. 27, 2020

(30) Foreign Application Priority Data
Sep. 20, 2017 (JP) .............. JP2017-179985

(51) Int. Cl.
B64C 39/02 (2006.01)
B64C 27/04 (2006.01)
B64D 47/08 (2006.01)

(52) U.S. Cl.
CPC ............ B64C 39/024 (2013.01); B64C 27/04 (2013.01); B64C 2201/024 (2013.01);
(Continued)

(58) Field of Classification Search
None
See application file for complete search history.

(56) References Cited

U.S. PATENT DOCUMENTS

2013/0311050 A1 11/2013 Cash et al.
2013/0345976 A1* 12/2013 Li .................. G01C 21/3476
701/533
(Continued)

FOREIGN PATENT DOCUMENTS

CN 104284577 A 1/2015
CN 105222779 A 1/2016
(Continued)

OTHER PUBLICATIONS

Official Communication issued in corresponding Chinese Patent Application No. 201880061177.9, dated Sep. 2, 2021.
(Continued)

Primary Examiner — Sze-Hon Kong
Assistant Examiner — Davin Seol
(74) Attorney, Agent, or Firm — Keating and Bennett, LLP

(57) ABSTRACT

A replenishment planning device calculates a first route replenishment point on a travel route at which replenishment of a chemical becomes necessary, a second route replenishment point on the travel route which is closer to a replenishment area than the first route replenishment point is, and first and second times necessary for an unmanned helicopter to travel from a travel start point, via the first and the second route replenishment points, to a replenishment area to have the chemical replenished, and to move back to the travel route. Thereafter, a process takes the first and the second route replenishment points as next travel start points, and calculates, for each, next first and second route replenishment points, and first and second times, and is repeated for each replenishment plan pattern until the first route replenishment point reaches a travel end point, such that position information and time information for each replenishment plan pattern are generated.

13 Claims, 29 Drawing Sheets

(52) U.S. Cl.
 CPC .. *B64C 2201/042* (2013.01); *B64C 2201/108* (2013.01); *B64C 2201/141* (2013.01); *B64D 47/08* (2013.01)

(56) References Cited

U.S. PATENT DOCUMENTS

| | | | |
|---|---|---|---|
| 2014/0172288 A1* | 6/2014 | Gutman | G01C 21/3476 701/400 |
| 2015/0111088 A1 | 4/2015 | Hiroki et al. | |
| 2016/0278277 A1* | 9/2016 | Vålberg | A01C 21/005 |
| 2017/0235303 A1 | 8/2017 | Haruta et al. | |
| 2018/0108260 A1 | 4/2018 | Kuhara | |
| 2019/0122454 A1* | 4/2019 | Fukunaga | A01B 69/008 |

FOREIGN PATENT DOCUMENTS

| | | |
|---|---|---|
| CN | 105955294 A | 9/2016 |
| CN | 106020237 A | 10/2016 |
| CN | 106660629 A | 5/2017 |
| EP | 3 184 419 A1 | 6/2017 |
| JP | 2002-166895 A | 6/2002 |
| JP | 2002-211494 A | 7/2002 |
| JP | 2004-322836 A | 11/2004 |
| JP | 2006-176073 A | 7/2006 |
| JP | 2017-078704 A | 4/2017 |
| JP | 2017-144811 A | 8/2017 |
| JP | 2017144811 A * | 8/2017 |
| KR | 10-2017-0032380 A | 3/2017 |
| NO | 2016/027544 A1 | 2/2016 |
| TW | I571718 B | 2/2017 |
| WO | WO-2018105400 A1 * | 6/2018 ............ A01B 69/00 |

OTHER PUBLICATIONS

Official Communication issued in International Patent Application No. PCT/JP2018/017344, dated Jul. 3, 2018.
Official Communication issued in corresponding Chinese Patent Application No. 201880061177.9, dated Apr. 1, 2022.

* cited by examiner

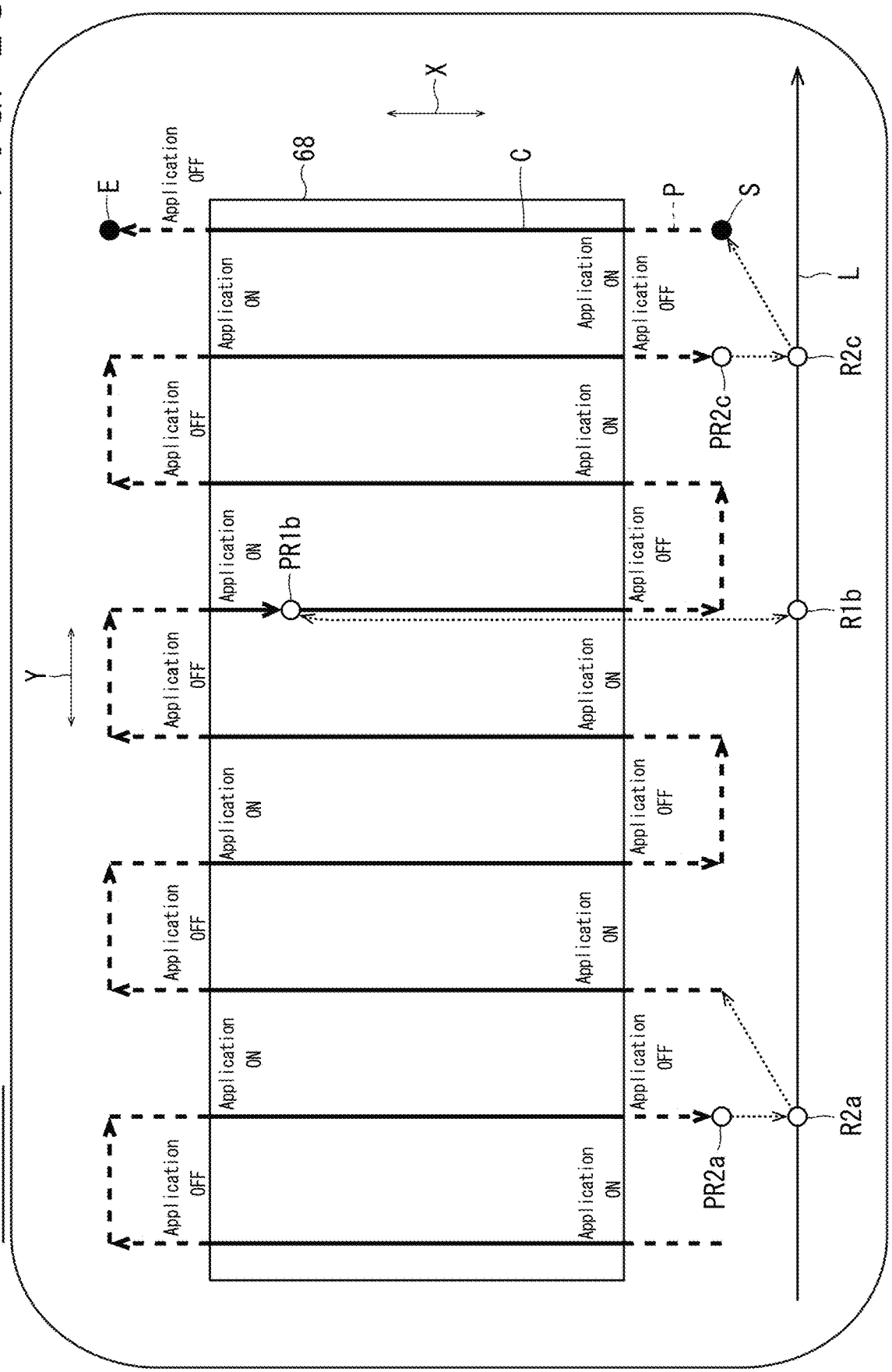

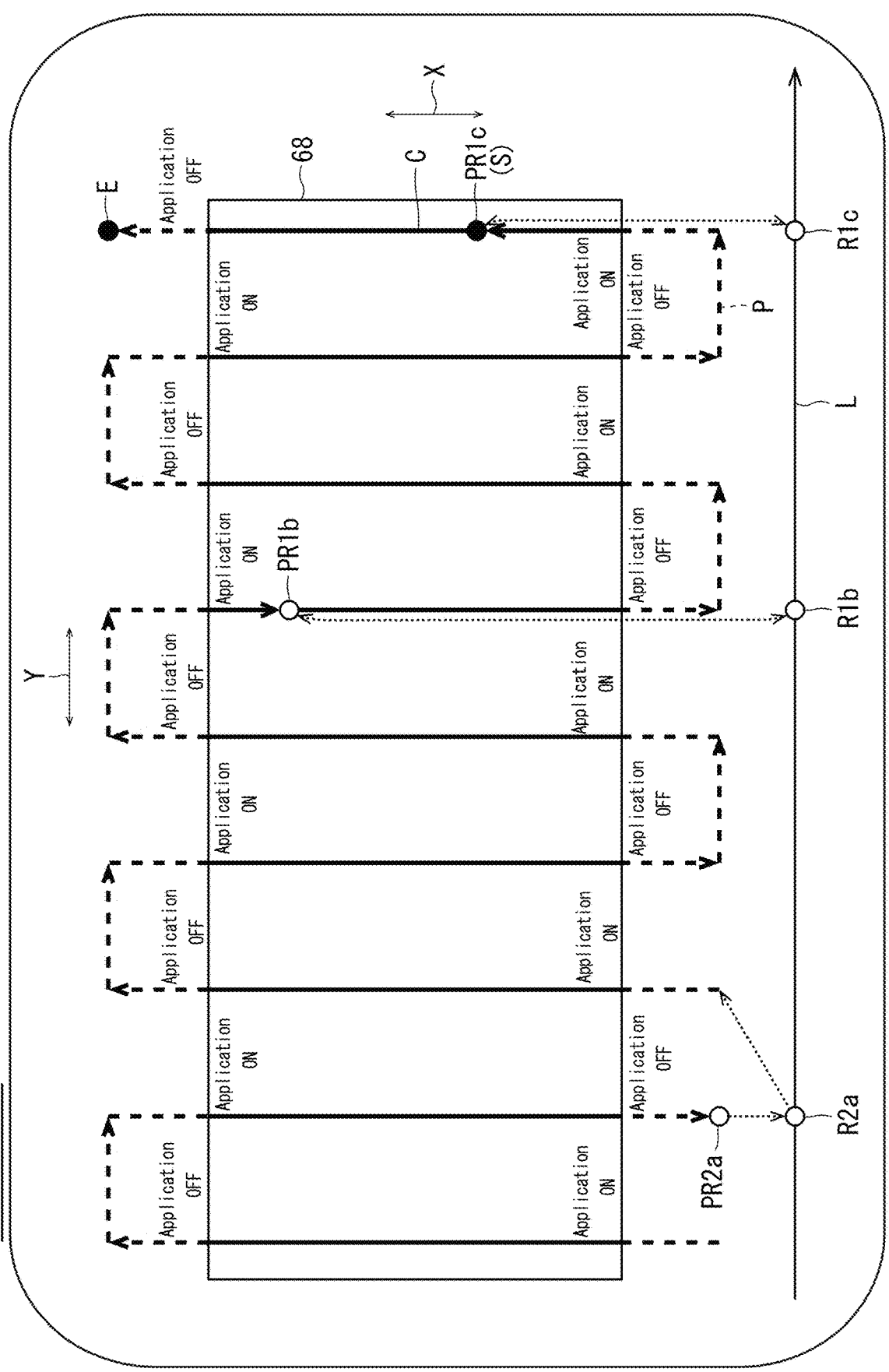

REPLENISHMENT PLANNING DEVICE AND REPLENISHMENT PLANNING METHOD

BACKGROUND OF THE INVENTION

1. Field of the Invention

The present invention relates to replenishment planning devices and replenishment planning methods, and more specifically to replenishment planning devices and replenishment planning methods for planning replenishment of a consumable material such as an application material which is loaded in and consumed by a moving body, e.g., an unmanned aircraft, as the moving body moves.

2. Description of the Related Art

As an example of conventional techniques of the above kind, JP-A 2002-211494 discloses a flight planning device which is capable of setting accurate flight area data by being moved above a perimeter of a planned flight area with a GPS receiver connected thereto and registering a position and a height given by the GPS receiver at each corner point of the flight area. JP-A 2002-211494 also discloses a flight planning device which collects position and height data from a GPS receiver mounted on a wirelessly operated unmanned helicopter in an actual model flight performed by, e.g., a skilled operator, and is capable of, e.g., automatically setting a flight route based on the collected position and height data, or automatically setting a flight route to cover the entire flight area in a minimum amount of time without changing a flight speed.

It may be possible with the conventional technique disclosed in JP-A 2002-211494 to execute a flight planning of an unmanned helicopter. However, if the unmanned helicopter is used in an agricultural field to apply an agricultural chemical, for example, it is impossible to know in advance where on the planned flight route the agricultural chemical replenishment will become necessary, or a replenishment timing of the agricultural chemical. It is not possible to make a plan for the replenishment of the agricultural chemical.

SUMMARY OF THE INVENTION

Preferred embodiments of the present invention provide replenishment planning devices which are able to easily make a replenishment plan of a consumable material loaded in a moving body, and replenishment planning methods therefor.

According to a preferred embodiment of the present invention, a replenishment planning device for planning replenishment of a consumable material loaded in and consumed by a moving body when the moving body travels includes a storage to store a travel route of the moving body including a travel start point and a travel end point, a travel speed at which the moving body travels along the travel route, a load amount of the consumable material, a consumption rate indicating an amount of consumption of the consumable material per unit time, a replenishment area to replenish the consumable material, a replenishment travel speed at which the moving body moves between the travel route and the replenishment area, and a replenishment time necessary to replenish the consumable material at the replenishment area; a first calculator to calculate, based on the travel speed, the load amount and the consumption rate, a first route replenishment point on the travel route at which replenishment of the consumable material becomes necessary when the moving body travels from the travel start point along the travel route; a second calculator to calculate a second route replenishment point on the travel route obtained by tracking back from the first route replenishment point along the travel route to a location that is closer to the replenishment area than the first route replenishment point; a third calculator to calculate, based on the travel speed, the replenishment travel speed, and the replenishment time, a first time necessary for the moving body to move from the travel start point to the first route replenishment point, move from the first route replenishment point to the replenishment area, have the consumable material replenished at the replenishment area, and move from the replenishment area to the travel route; a fourth calculator to calculate, based on the travel speed, the replenishment travel speed, and the replenishment time, a second time necessary for the moving body to move from the travel start point to the second route replenishment point, move from the second route replenishment point to the replenishment area, have the consumable material replenished at the replenishment area, and move from the replenishment area to the travel route; and a notifier to notify at least one replenishment plan pattern which includes position information based on the first route replenishment point and the second route replenishment point, and time information based on the first time and the second time. The replenishment planning device generates the position information and the time information for each replenishment plan pattern by having the first calculator through the fourth calculator calculate the first route replenishment point, the second route replenishment point, the first time, and the second time and thereafter repeating the process of taking the first route replenishment point and the second route replenishment point as next travel start points; and for each of which having the first calculator through the fourth calculator calculate a next first route replenishment point, a next second route replenishment point, a next first time, and a next second time until the first route replenishment point reaches the travel end point in each replenishment plan pattern.

Also, there is provided a replenishment planning method for planning replenishment of a consumable material loaded in and consumed by a moving body as the moving body travels based on a travel route of the moving body including a travel start point and a travel end point, a travel speed at which the moving body travels along the travel route, a load amount of the consumable material, a consumption rate indicating an amount of consumption of the consumable material per unit time, a replenishment area to replenish the consumable material, a replenishment travel speed at which the moving body moves between the travel route and the replenishment area, and a replenishment time necessary to replenish the consumable material at the replenishment area. The method includes a first step of calculating, based on the travel speed, the load amount and the consumption rate, of a first route replenishment point on the travel route at which replenishment of the consumable material becomes necessary when the moving body travels from the travel start point along the travel route; a second step of calculating a second route replenishment point on the travel route obtained by tracking back from the first route replenishment point along the travel route to a location that is closer to the replenishment area than the first route replenishment point; a third step of calculating, based on the travel speed, the replenishment travel speed and the replenishment time, a first time necessary for the moving body to move from the travel start point to the first route replenishment point, move from the first route replenishment point to the replenishment area, have the consumable material replenished at the replenishment area, and move from the replenishment area to the travel route; a fourth step of calculating, based on the travel speed, the replenishment travel speed, and the replenishment time, a second time necessary for the moving body to move from the travel start point to the second route replenishment point, move from the second route replenishment point to the replenishment area, have the consumable material replenished at the replenishment area, and move from the replenishment area to the travel route; a fifth step of taking the first route replenishment point and the second route replenishment point as next travel start points; and a sixth step of notifying at least one replenishment plan pattern which includes position information based on the first route replenishment point and the second route replenishment point, and time information based on the first time and the second time. The method generates the position information and the time information for each replenishment plan pattern by executing the first through the fourth calculating steps to calculate the first route replenishment point, the second route replenishment point, the first time, and the second time, and thereafter repeating the process of executing the fifth step to take the first route replenishment point and the second route replenishment point as next travel start points; and for each of which executing the first through fourth calculating steps to calculate a next first route replenishment point, a next second route replenishment point, a next first time, and a next second time until the first route replenishment point reaches the travel end point in each replenishment plan pattern; and then executes the sixth step to notify at least one replenishment plan pattern.

In the preferred embodiment described above, after a process of calculating the first route replenishment point, the second route replenishment point, the first time, and the second time, then a process of taking the first route replenishment point and the second route replenishment point as the next travel start points, calculating, for each, the next first route replenishment point, the next second route replenishment point, the next first time, and the next second time is repeated for each replenishment plan pattern until the first route replenishment point reaches the travel end point. As a result, at least one replenishment plan pattern is created. The replenishment plan pattern includes position information which is based on the first route replenishment point and the second route replenishment point, and time information based on the first time and the second time, and it is possible to identify a position on the travel route at which replenishment of the consumable material becomes necessary based on the position information, and to identify a time to replenish the consumable material based on the time information. The number of the replenishment plan patterns increases exponentially with base 2 unless any one of the first route replenishment points reaches the travel end point. When the first route replenishment point reaches the travel end point in any replenishment plan pattern, that replenishment plan pattern is finalized. Each of the obtained replenishment plan patterns in this way has a different combination of the first route replenishment point and the second route replenishment point, and accordingly has a different combination of the first time and the second time. In other words, various replenishment plan patterns are obtained. Therefore, in cases in which the plurality (for example, all) of the obtained replenishment plan patterns are notified, it is possible to select a desired replenishment plan pattern from the notified replenishment plan patterns, and to identify in advance positions on the travel route at which replenishment of the consumable material is necessary and replenishment timings of the consumable material from the selected replenishment plan pattern. Also, in cases in which one of the obtained replenishment plan patterns is selected and notified, it is possible to identify in advance a position on the travel route at which the replenishment of the consumable material will become necessary and a time of replenishment of the consumable material from that replenishment plan pattern. As a result, it is possible to easily make a replenishment plan of the consumable material loaded in the moving body.

Preferably, the replenishment planning device further includes a selector to select the replenishment plan pattern to be notified based on the time information. In this case, it is possible to select a replenishment plan pattern which has a desired replenishment timing based on the time information.

Further preferably, the replenishment planning device further includes a fifth calculator to calculate, for each replenishment plan pattern when the first route replenishment point reaches the travel end point, a total time of final travel time from the immediately previous first route replenishment point or the immediately previous second route replenishment point through the travel end point, all the first times and all the second times; and the selector selects the replenishment plan pattern which has a shortest total time in the time information. In this case, it is possible to select a replenishment plan pattern which allows the moving body to travel from the first travel start point on the travel route to the travel end point in the shortest amount of time.

Further, preferably, the replenishment planning device further includes a sixth calculator to calculate a position in the replenishment area which is closest from the first route replenishment point as a first replenishment point; and a seventh calculator to calculate a position in the replenishment area which is closest from the second route replenishment point as a second replenishment point. In this case, it is possible to identify positions in the replenishment area at which the consumable material should be replenished and replenishment timings therefor, in advance for each replenishment plan pattern. Further, it is possible in each replenishment plan pattern to shorten an amount of travel time for the moving body to move between the travel route and the first replenishment point and an amount of travel time to move between the travel route and the second replenishment point for replenishment of the consumable material, such that it is possible to shorten the first time and the second time. Therefore, it is possible in each replenishment plan pattern to shorten an amount of time for the moving body to move from the first travel start point on the travel route to the travel end point.

Preferably, the first time calculated by the third calculator is an amount of time necessary for the moving body to move from the travel start point to the first route replenishment point, make a round trip between the first route replenishment point and the first replenishment point, and have the consumable material replenished at the first replenishment point, whereas the second time calculated by the fourth calculator is an amount of time necessary for the moving body to move from the travel start point to the second route replenishment point, make a round trip between the second route replenishment point and the second replenishment point, and have the consumable material replenished at the second replenishment point. In this case, the amount of travel time for the moving body to move between the travel route and the replenishment area to replenish consumable material is the amount of time necessary to make a round trip between the first route replenishment point and the first replenishment point or between the second route replenishment point and the second replenishment point. Therefore, it is easy to set an amount of time to move between the travel route and the replenishment area.

Further preferably, the second route replenishment point is also a first position on the travel route at which a ratio of a distance to the replenishment area to a travel distance from the travel start point is smallest, or by a second position on the travel route from which a distance to the replenishment area is equal to a distance from the first position to the replenishment area. In this case, it is possible to make the second route replenishment point at which the distance to the replenishment area is decreased.

Further, preferably, the second route replenishment point is a position on the travel route at which a ratio of a distance to the replenishment area to a travel distance from the travel start point is smallest. In this case, it is possible to make the second route replenishment point at which the travel distance from the travel start point is increased and the distance to the replenishment area is decreased.

Preferably, the travel route includes a route made of reciprocating traveling in a first direction and traveling in a second direction perpendicular or substantially perpendicular to the first direction, and the replenishment area includes a replenishment line extending parallel or substantially parallel to the second direction. In this case, it is possible to make the second route replenishment point at a position where the distance to the replenishment area is shorter than in cases in which the replenishment line extends parallel or substantially parallel to the first direction.

Further preferably, the moving body moves automatically along the travel route. In this case, the arrangement decreases a time difference between the calculated travel time from the travel start point to the first route replenishment point obtained by the third calculator and an actual travel time when the movement is made automatically from the travel start point to the first route replenishment point along the travel route. This also decreases a time difference between the calculated travel time from the travel start point to the second route replenishment point obtained by the fourth calculator and an actual travel time when the movement is made automatically from the travel start point to the second route replenishment point along the travel route, and therefore, it is possible to obtain a replenishment plan that is closer to an actual amount of consumption of the consumable material.

Further, preferably, the consumable material is an application material. In a preferred embodiment of the present invention, the application material is a fertilizer or a chemical applied while the moving body is moving.

Preferably, the storage further stores a consumption route in the travel route along which the application material is consumed, and the first calculator calculates the first route replenishment point based on the travel speed, the consumption route, the load amount, and the consumption rate. In this case, it is possible to obtain a replenishment plan which is closer to the actual amount of consumption of the application material.

Further preferably, the moving body is an unmanned aircraft. In a preferred embodiment of the present invention, the unmanned aircraft is an unmanned helicopter or a multicopter.

According to preferred embodiments of the present invention, it is possible to easily make a replenishment plan of the consumable material loaded in the moving body.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 28 is an illustrative drawing which shows a completed state of a plan number 6 replenishment plan pattern.

FIG. 29 is an illustrative drawing which shows a completed state of the plan number 2 replenishment plan pattern.

DETAILED DESCRIPTION OF THE PREFERRED EMBODIMENTS

Hereinafter, preferred embodiments of the present invention will be described with reference to the drawings.

Figure 1:
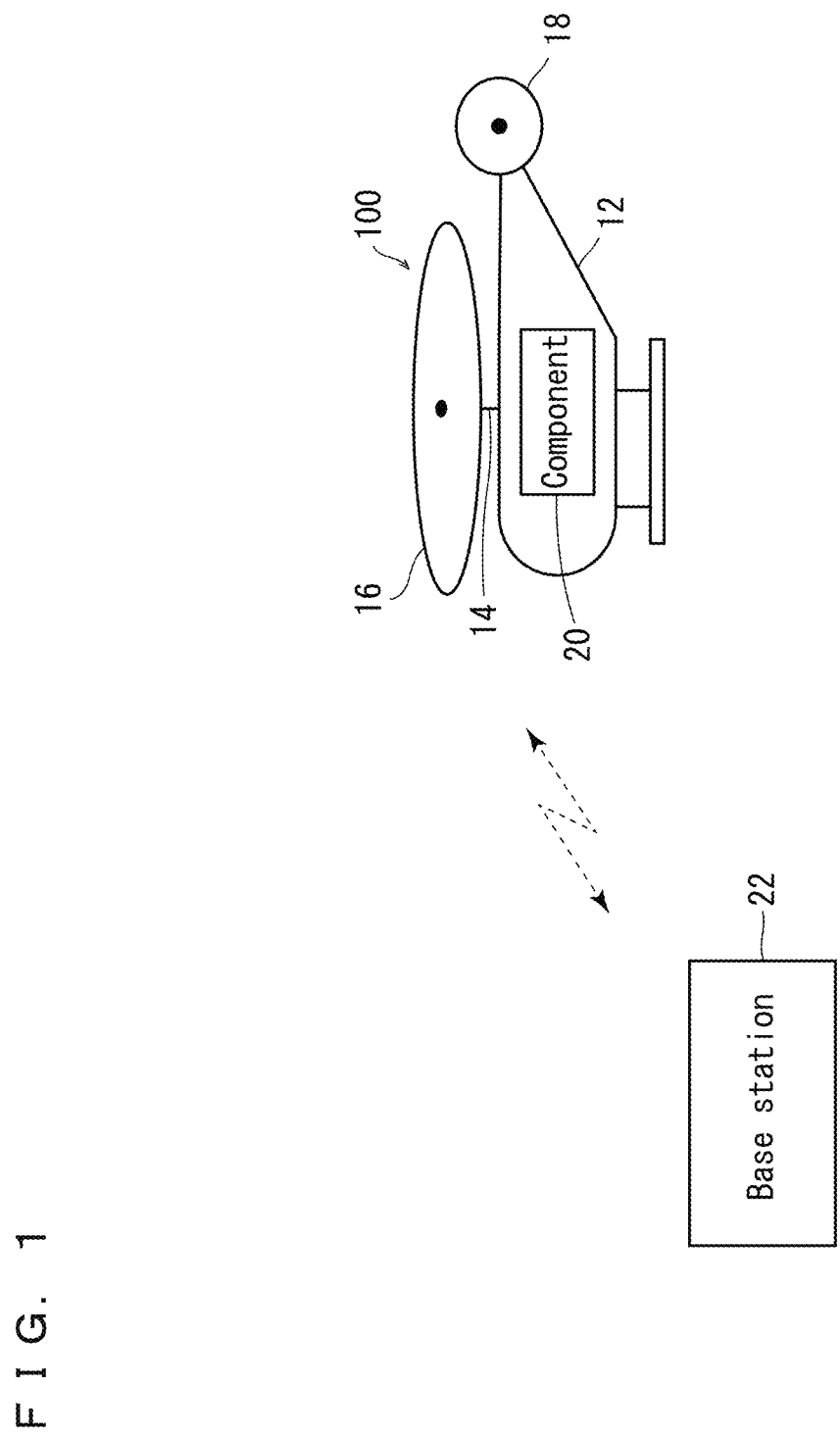
FIG. 1 is an illustrative drawing which shows a base station and an unmanned helicopter.
Figure 2:
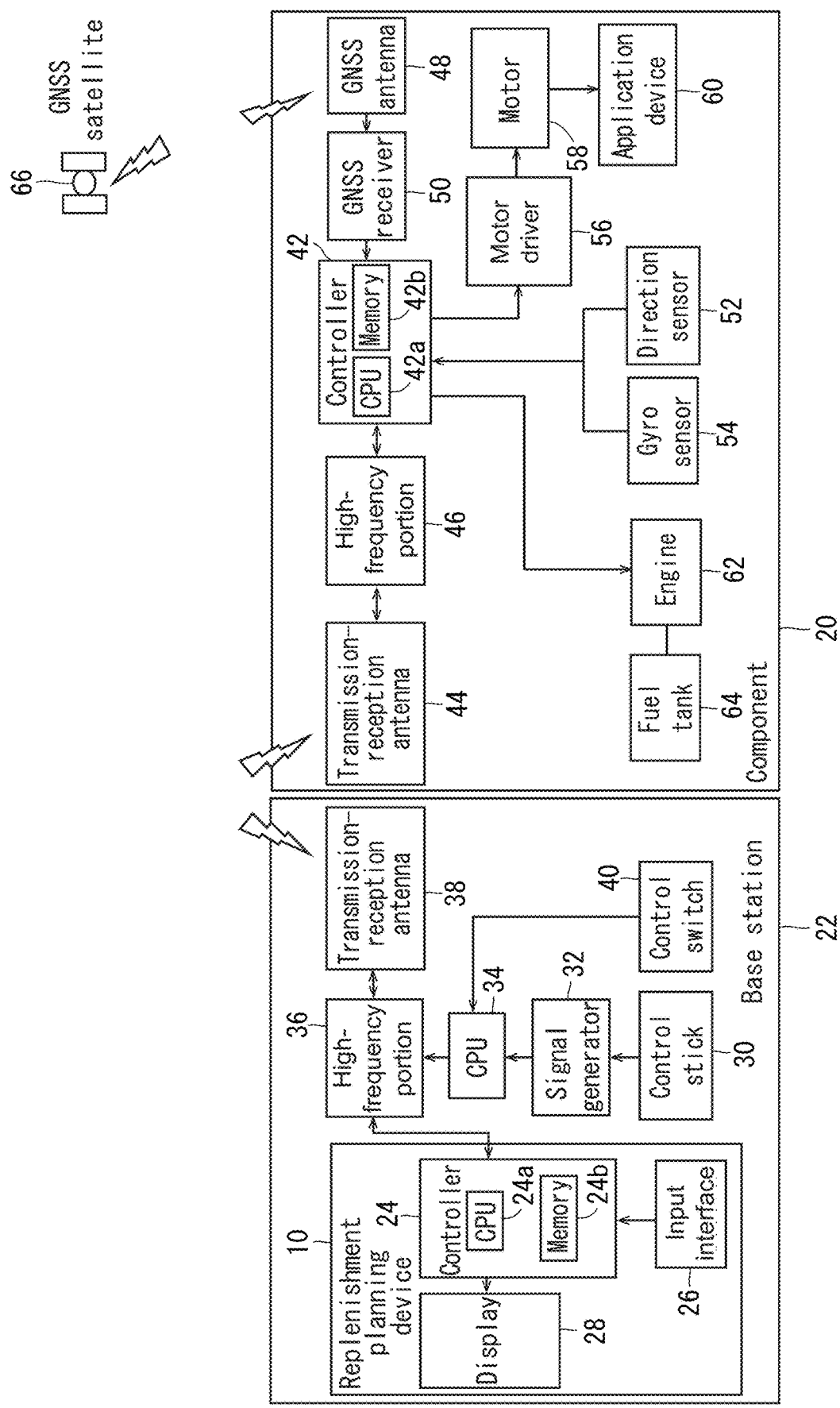
FIG. 2 is an electrical block diagram which shows the base station including a replenishment planning device according to a preferred embodiment of the present invention, a component included in the unmanned helicopter, and a GNSS satellite.

Referring to FIG. 1 and FIG. 2, a replenishment planning device 10 according to a preferred embodiment of the present invention is utilized to plan replenishment of a chemical loaded in and applied by an unmanned helicopter 100, which is an example of a moving body, as the unmanned helicopter 100 travels.

The unmanned helicopter 100 includes a body 12, a mast 14, a main rotor 16, a tail rotor 18, and a component 20. The mast 14 protrudes upward from the body 12, and is rotatable. The mast 14 includes an upper end portion where the main rotor 16 is fixed. The tail rotor 18 is rotatable, and is at a rear end portion of the body 12. The component 20 is provided in the body 12.

The replenishment planning device 10 is included in a base station 22 which sends/receives signals to and from the unmanned helicopter 100. The replenishment planning device 10 may include a personal computer, for example, and includes a controller 24, an input interface 26, and a display 28. The controller 24 includes a CPU 24a and a memory 24b. The memory 24b stores programs to control operation of the replenishment planning device 10, information inputted from the input interface 26, and so on.

For example, the memory 24b stores a travel route of the unmanned helicopter 100 including a travel start point and a travel end point; a consumption route in the travel route along which the chemical is consumed; a travel speed at which the unmanned helicopter 100 moves along the travel route; an amount of the chemical loaded in an application device 60 (to be described below); a consumption rate which represents an amount of the chemical consumed in a unit time; a replenishment area at which the chemical is replenished; a replenishment travel speed at which the unmanned helicopter 100 moves between the travel route and the replenishment area; and a replenishment time which is an amount of time necessary for the chemical replenishment at the replenishment area. The travel start point is a position at which the travel of the unmanned helicopter 100 is started on the travel route, and includes a start point of the travel route and a point (position) at which the travel is resumed after the replenishment. The travel end point is an end point of the travel route. The amount of the loaded chemical is an amount of the chemical which is loaded in the application device 60 at the travel start point. The consumption rate may be set according to the travel speed. The replenishment travel speed should preferably be greater than the travel speed. The replenishment time is an amount of time from starting of a landing operation onto the replenishment area, through taking off the replenishment area to starting of movement toward the travel route.

The memory 24b also stores the following information for each replenishment plan pattern: a plan number, a first route replenishment point, a second route replenishment point, a first replenishment point, a second replenishment point, a first time, a second time, a final travel time, position information, time information, a replenishment count, and replenishment due time. The plan number is an identification number assigned to each replenishment plan pattern. The first route replenishment point is a position on the travel route at which replenishment of the chemical becomes necessary when the unmanned helicopter 100 is traveling from the travel start point along the travel route. The second route replenishment point is a position on the travel route which is obtained by tracking back from the first route replenishment point along the travel route to a location that is closer to the replenishment area than the first route replenishment point. The first replenishment point and the second replenishment point are chemical replenishment positions in the replenishment area. The first replenishment point is a position which is closest from the first route replenishment point in the replenishment area. The second replenishment point is a position which is closest from the second route replenishment point in the replenishment area. The first time is an amount of time necessary for the unmanned helicopter 100 to move from the travel start point to the first route replenishment point, move from the first route replenishment point to the replenishment area (the first replenishment point), have the chemical replenished at the replenishment area (the first replenishment point), and then move from the replenishment area (the first replenishment point) to the travel route. The second time is an amount of time necessary for the unmanned helicopter 100 to move from the travel start point to the second route replenishment point, move from the second route replenishment point to the replenishment area (the first replenishment point), have the chemical replenished at the replenishment area (the second replenishment point), and then move from the replenishment area (the second replenishment point) to the travel route. The final travel time is a travel time when the first route replenishment point reaches the travel end point, from the immediately preceding first route replenishment point or the immediately preceding second route replenishment point, to the travel end point. The position information is information based at least on the first route replenishment point and the second route replenishment point, and includes, in the present preferred embodiment, the first route replenishment point, the second route replenishment point, the first replenishment point, and the second replenishment point in each replenishment plan pattern. The time information is information based at least on the first time and the second time. The time information includes the following information in each replenishment plan pattern in the present preferred embodiment: the first time, the second time, the final travel time, an in-travel replenishment time which is an accumulated amount of time of the first time and the second time, and a total in-travel replenishment time which is a total amount of time of all first times, all second times, and the final travel time. The replenishment count represents how many times the chemical will be replenished while moving on the travel route. The replenishment due time is a time point at which a replenishment is to be made at the first replenishment point and the second replenishment point, and is obtained by adding an in-travel replenishment time to a time at which the travel is started from the start point of the travel route. It should be noted here that the replenishment due time may be an amount of time passed since the travel was started from the start point of the travel route, i.e., an in-travel replenishment time.

The CPU 24a (the controller 24) executes the programs stored in the memory 24b, thus making replenishment plans and displaying results in the display 28.

The base station 22 further includes a control stick 30, a signal generator 32, a CPU 34, a high-frequency portion 36, a transmission-reception antenna 38, and a control switch 40.

The control stick 30 steers the unmanned helicopter 100. By operating the control stick 30, an engine 62 (to be described below), for example, is controlled and rotation of the main rotor 16 and of the tail rotor 18 is thus controlled.

The signal generator 32 generates analog operation information representing the operation of the control stick 30. The CPU 34 receives the analog operation information and converts it to digital operation information, which is then sent to the high-frequency portion 36.

Also, when the control switch 40 is turned ON, application of the chemical is started, and when the control switch 40 is turned OFF, the application of the chemical is stopped. Signals from the control switch 40 are supplied to the CPU 34. The CPU 34 converts the supplied signals to digital operation information and sends it to the high-frequency portion 36.

The high-frequency portion 36 performs modulation by using the digital operation information, and an obtained radio signal is automatically transmitted from the transmission-reception antenna 38.

It should be noted here that the base station 22 may be divided into a base station which includes the replenishment planning device 10, and another base station which includes the control stick 30 and the control switch 40. In this case, the base station which includes the replenishment planning device 10 further includes a high-frequency portion and a transmission-reception antenna while the other base station which includes the control stick 30 and the control switch 40 further includes a CPU, a signal generator, a high-frequency portion, and a transmission-reception antenna.

The component 20 of the unmanned helicopter 100 includes a controller 42, a transmission-reception antenna 44, a high-frequency portion 46, a GNSS (Global Navigation Satellite System) antenna 48, a GNSS receiver 50, a direction sensor 52, a gyro sensor 54, a motor driver 56, a motor 58, the application device 60, the engine 62, and a fuel tank 64.

The radio signal which is sent from the transmission-reception antenna 38 of the base station 22 is received by the transmission-reception antenna 44 of the unmanned helicopter 100, and then demodulated by the high-frequency portion 46 into digital operation information which represents the operation made on the base station 22, and the information is supplied to the controller 42. Also, GNSS signals from the GNSS satellite 66 regarding the unmanned helicopter 100 are received by the GNSS antenna 48 and supplied to the GNSS receiver 50. The GNSS receiver 50 extracts, from the supplied GNSS signal, information regarding the position and speed information indicating the current speed of the unmanned helicopter 100. The information regarding the position and the speed information are supplied to the controller 42. Also, the direction sensor 52 and the gyro sensor 54 respectively detect flight direction and angular velocity of the unmanned helicopter 100. The detected direction signal and the detected angular velocity signal are supplied to the controller 42.

The controller 42 includes a CPU 42a and a memory 42b. The CPU 42a (the controller 42) executes the programs stored in the memory 42b, and provides instructions to various constituent elements, thus controlling the unmanned helicopter 100. For example, the CPU 42a (controller 42) generates control information based on the supplied operation information and controls the motor driver 56, thus making the motor driver 56 drive the motor 58. As the motor 58 is driven, chemical application by the application device 60 is performed. The CPU 42a (the controller 42) also controls operation of the engine 62 based on the supplied operation information, thus controlling rotation of the main rotor 16 and of the tail rotor 18. Further, the CPU 42a (controller 42) detects a flight distance of the unmanned helicopter 100 from the supplied information regarding the position. As another method, the CPU 42a (controller 42) may integrate the supplied speed information to detect a flight distance of the unmanned helicopter 100. The application device 60 stores the chemical which is to be applied. The fuel tank 64 stores fuel which is to be supplied to the engine 62.

In the present preferred embodiment, the memory 24b represents the storage; the CPU 24a represents the first calculator, the second calculator, the third calculator, the fourth calculator, the fifth calculator, the sixth calculator, the seventh calculator, and the selector; and the display 28 represents the notifier.

Figure 3:
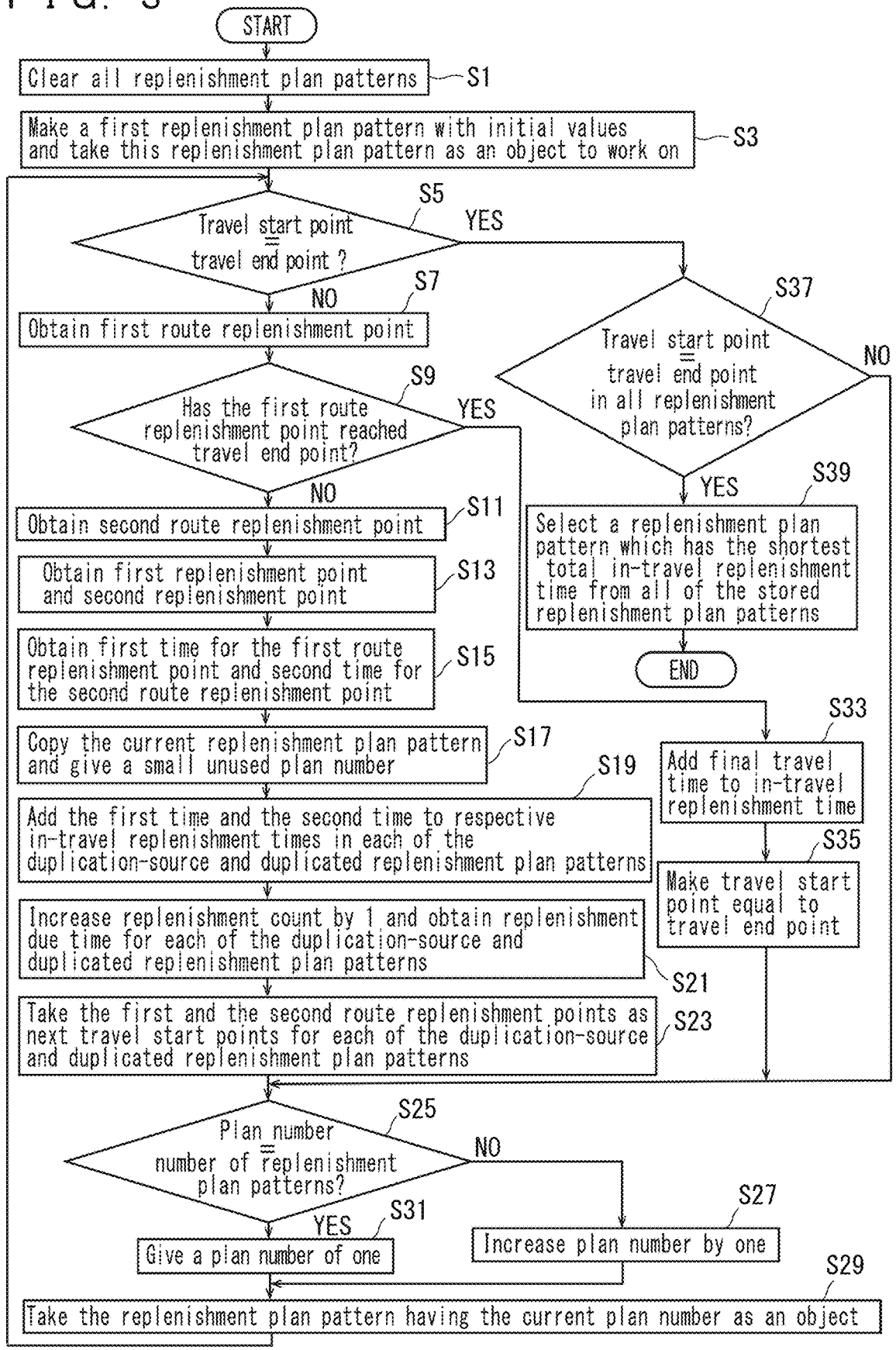
FIG. 3 is a flowchart which shows an example of a replenishment planning process.

Referring to FIG. 3, description will be made for an example of a replenishment planning process of the unmanned helicopter 100.

In this example, the consumable material is represented by a chemical, and replenishment planning of the chemical is performed by the replenishment planning device 10.

First, the CPU 24a of the replenishment planning device 10 clears all replenishment plan patterns (Step S1).

Next, the CPU 24a makes the first replenishment plan pattern by using initial values, and develops a replenishment plan using this replenishment plan pattern as an object (Step S3). In other words, in this replenishment plan pattern the plan number is set to 1; the travel start point is set to the start point of the travel route; and all the other information is cleared to null.

Then, the CPU 24a determines whether or not the travel start point and the travel end point are equal to each other in the replenishment plan pattern which is the current object to work on (Step S5). If the travel start point and the travel end point are not equal to each other, the CPU 24a obtains, using the travel start point as a starting point, the first route replenishment point on the travel route where chemical replenishment will become necessary based on a consumption route in the travel route, a travel speed, an amount of chemical load, and a chemical consumption rate (Step S7). In this example, the first route replenishment point is obtained as a position on the travel route where an applicable amount of the chemical will become zero. However, the first route replenishment point may be obtained as a position on the travel route where an applicable amount of the chemical will become not larger than a predetermined value.

The CPU 24a determines whether or not the first route replenishment point has reached the travel end point of the travel route (Step S9). If the first route replenishment point has not reached the travel end point, the CPU 24a obtains the second route replenishment point (Step S11). In the present example, the second route replenishment point is a position on the travel route obtained by tracking back from the first route replenishment point along the travel route to a location closer to the replenishment area than the first route replenishment point, and provides the smallest ratio of a distance from the second route replenishment point to the replenishment area to a travel distance from the travel start point to the second route replenishment point.

Then, the CPU 24a obtains the first replenishment point on the replenishment area based on the first route replenishment point, and the second replenishment point on the replenishment area based on the second route replenishment point (Step S13). The first replenishment point is a place in the replenishment area which is closest to the first route replenishment point, while the second replenishment point is a place in the replenishment area which is closest to the second route replenishment point.

Next, the CPU 24a calculates the first time and the second time based on the travel speed, the replenishment travel speed, and the replenishment time (Step S15). The first time is an amount of time necessary for the unmanned helicopter 100 to move from the travel start point to the first route replenishment point, to make a round trip between the first route replenishment point and the replenishment area, and to replenish the chemical at the replenishment area. The second time is an amount of time necessary for the unmanned helicopter 100 to move from the travel start point to the second route replenishment point, to make a round trip between the second route replenishment point and the replenishment area, and to replenish the chemical at the replenishment area.

Thereafter, the CPU 24a makes a copy of the replenishment plan pattern which is the working object at this point, and assigns a small, unused number to the copy of the replenishment plan pattern as its plan number (Step S17). At this point, for both of the duplication-source and the duplicated replenishment plan patterns, the plan number, the first route replenishment point, the second route replenishment point, the first replenishment point, the second replenishment point, the first time, and the second time are stored in the memory 24b. Then the first time is added to the in-travel replenishment time of the duplication-source replenishment plan pattern, the second time is added to the in-travel replenishment time of the duplicated replenishment plan pattern, such that the in-travel replenishment time from the start point of the travel route is updated in each, and is stored in the memory 24b (Step S19). Also, for each of the duplication-source and the duplicated replenishment plan patterns, the replenishment count is increased by one, the replenishment due time is obtained based on the updated in-travel replenishment time, and the replenishment count and the replenishment due time are stored in the memory 24b (Step S21). Further, the first route replenishment point is taken as the next travel start point for the duplication-source replenishment plan pattern, the second route replenishment point is taken as the next travel start point for the duplicated replenishment plan pattern, and these are stored in the memory 24b (Step S23). In this way, position information and time information are stored in the memory 24b for each replenishment plan pattern.

Next, the CPU 24a determines whether or not the plan number is equal to the number of replenishment plan patterns at this point (Step S25). If the plan number is not equal to the number of replenishment plan patterns, the CPU 24a increases the plan number by an increment of one (Step S27), takes the replenishment plan pattern of that plan number as the next object of processing (Step S29), and returns to Step S5. On the other hand, if Step S25 finds that the plan number is equal to the number of replenishment plan patterns, the CPU 24a sets the plan number to 1 (i.e., returns to the first replenishment plan pattern) (Step S31), and goes to Step S29.

If Step S9 finds that the first route replenishment point has reached the travel end point of the travel route, the CPU 24a obtains the final travel time. The final travel time is added to the in-travel replenishment time to calculate a total in-travel replenishment time (total time) in the travel route. The final travel time and the total in-travel replenishment time are stored in the memory 24b (Step S33). Then, the travel start point is taken as the travel end point (Step S35), and the process goes to Step S25.

On the other hand, if Step S5 finds that the travel start point is equal to the travel end point, the process determines whether or not the travel start point is equal to the travel end point in all of the replenishment plan patterns (Step S37). If the travel start point is not equal to the travel end point in any of the replenishment plan patterns, the process returns to Step S25. On the other hand, if the travel start point is equal to the travel end point in all of the replenishment plan patterns, the CPU 24a selects the replenishment plan pattern which has the shortest total in-travel replenishment time from all of the stored replenishment plan patterns. The selected replenishment plan pattern is displayed in the display 28 (Step S39), and the process comes to the end.

When a human operator chooses automatic flight in the input interface 26, it is possible to make automatic flight of and automatic chemical application by the unmanned helicopter 100 based on the selected replenishment plan pattern. On the other hand, when the operator manually operates the control stick 30 and the control switch 40, it is possible to make both of the flight of unmanned helicopter 100 and the chemical application manually based on the selected replenishment plan pattern.

Figure 4:
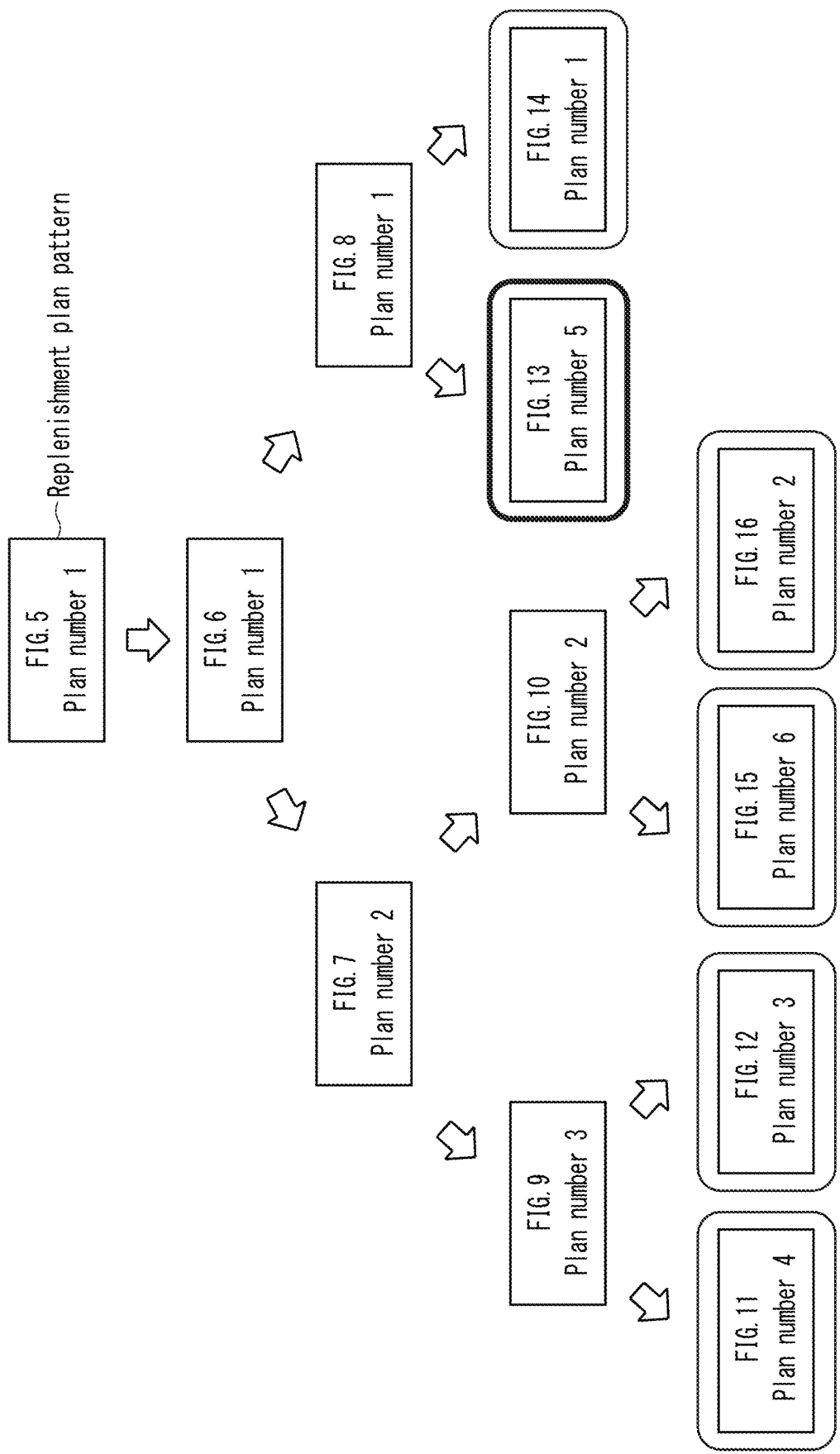
FIG. 4 is an illustrative drawing which shows an example of transitions when making replenishment plan patterns.

Next, referring to FIG. 4 through FIG. 16, description will be made for an example of a replenishment planning process of the chemical loaded in the unmanned helicopter 100. In this example, the chemical will be applied in a rectangular application area 68 such as a crop field. A travel route P is a route composed of reciprocating movement in a first direction X above the application area 68, and movement in a second direction Y which is perpendicular or substantially perpendicular to the first direction X above an area outside of the application area 68. A consumption route C is composed of portions of the travel route P lying inside the application area 68. The chemical will be applied (consumed) along the consumption route C. Outside the application area 68, a replenishment line L extends parallel or substantially parallel to the second direction Y as a replenishment area. FIG. 4 shows transitions in the process of making replenishment plan patterns.

Figure 5:
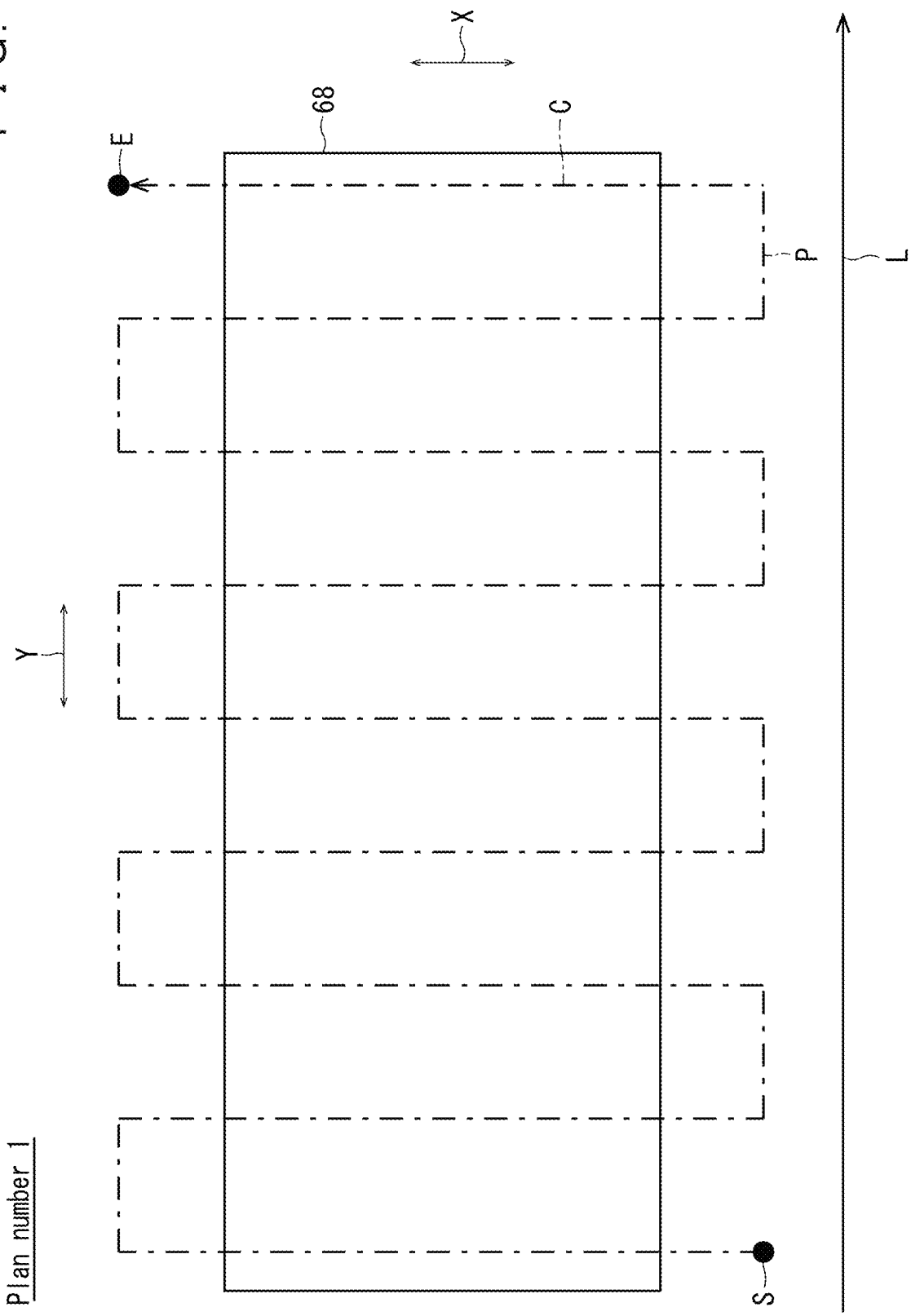
FIG. 5 is an illustrative drawing which shows an initial state of a plan number 1 replenishment plan pattern.

First, the CPU 24a of the replenishment planning device 10 clears all replenishment plan patterns, and then a replenishment plan pattern which is shown in FIG. 5 and is plan number 1 is made as the first replenishment plan pattern by using initial values. At this stage, a travel start point S is set to the start point of the travel route P, and all the other information is cleared to null.

Figure 6:
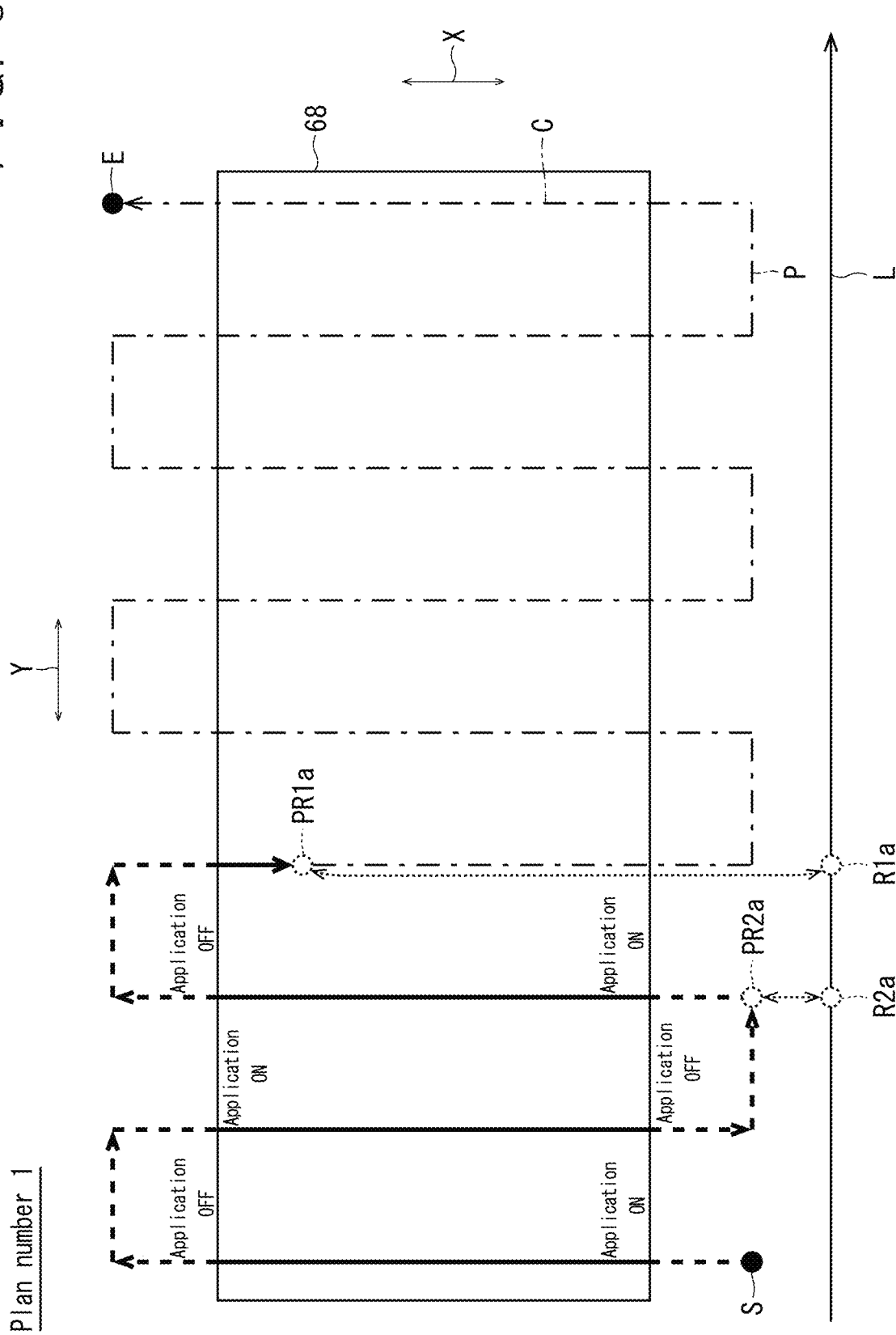
FIG. 6 is an illustrative drawing which shows a subsequent state of the plan number 1 replenishment plan pattern.

Then, as shown in FIG. 6, in the plan number 1 replenishment plan pattern, the CPU 24a obtains the first route replenishment point PR1a on the travel route P where chemical replenishment will become necessary based on the consumption route C, a travel speed, an amount of chemical load, and a chemical consumption rate. Since the first route replenishment point PR1a has not reached the travel end point E of the travel route P, the CPU 24a obtains the second route replenishment point PR2a. The second route replenishment point PR2a is a position on the travel route P obtained by tracking back from the first route replenishment point PR1a along the travel route P to a location that is closer to the replenishment line L than the first route replenishment point PR1a, and provides the smallest ratio of a distance from the second route replenishment point PR2a to the replenishment line L to a travel distance from the travel start point S to the second route replenishment point PR2a. If there is a plurality of such positions, one which is closest from the first route replenishment point PR1a is selected. Then, the CPU 24a obtains a position on the replenishment line L which is closest from the first route replenishment point PR1a as the first replenishment point R1a, and a position which is closest from the second route replenishment point PR2a as the second replenishment point R2a.

Next, the CPU 24a calculates the first time which is an amount of time necessary for the unmanned helicopter 100 to move from the travel start point S to the first route replenishment point PR1a, to make a round trip between the first route replenishment point PR1a and the first replenishment point R1a, and to replenish the chemical at the first replenishment point R1a based on the travel speed, the replenishment travel speed and the replenishment time. Likewise, the CPU 24a calculates the second time which is an amount of time necessary for the unmanned helicopter 100 to move from the travel start point S to the second route replenishment point PR2a, to make a round trip between the second route replenishment point PR2a and the second replenishment point R2a, and to replenish the chemical at the second replenishment point R2a based on the travel speed, the replenishment travel speed, and the replenishment time.

Figure 7:
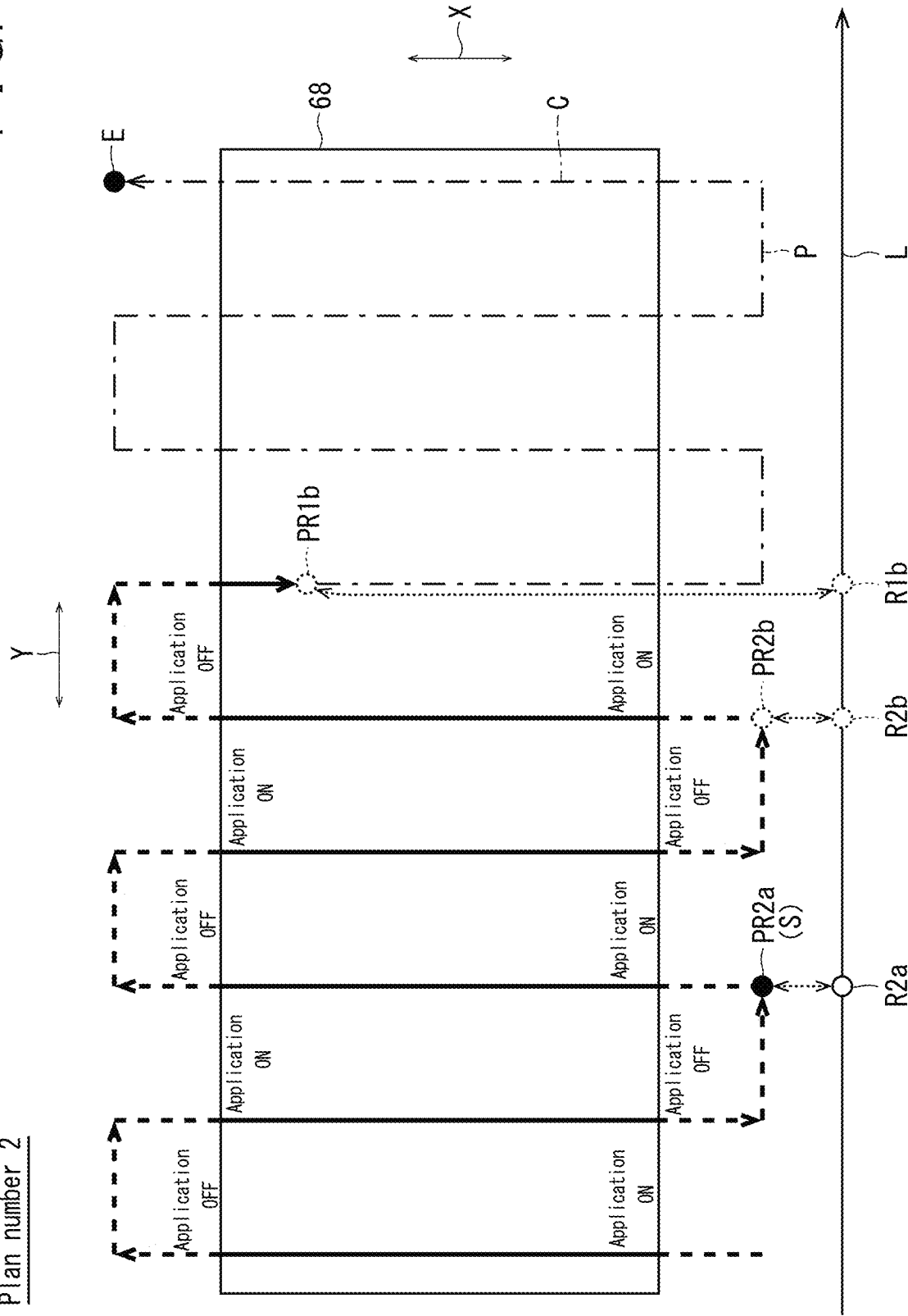
FIG. 7 is an illustrative drawing which shows a state of a plan number 2 replenishment plan pattern.

Thereafter, the CPU 24a makes a copy of the plan number 1 replenishment plan pattern shown in FIG. 6, such that a plan number 2 replenishment plan pattern shown in FIG. 7 is obtained.

Figure 8:
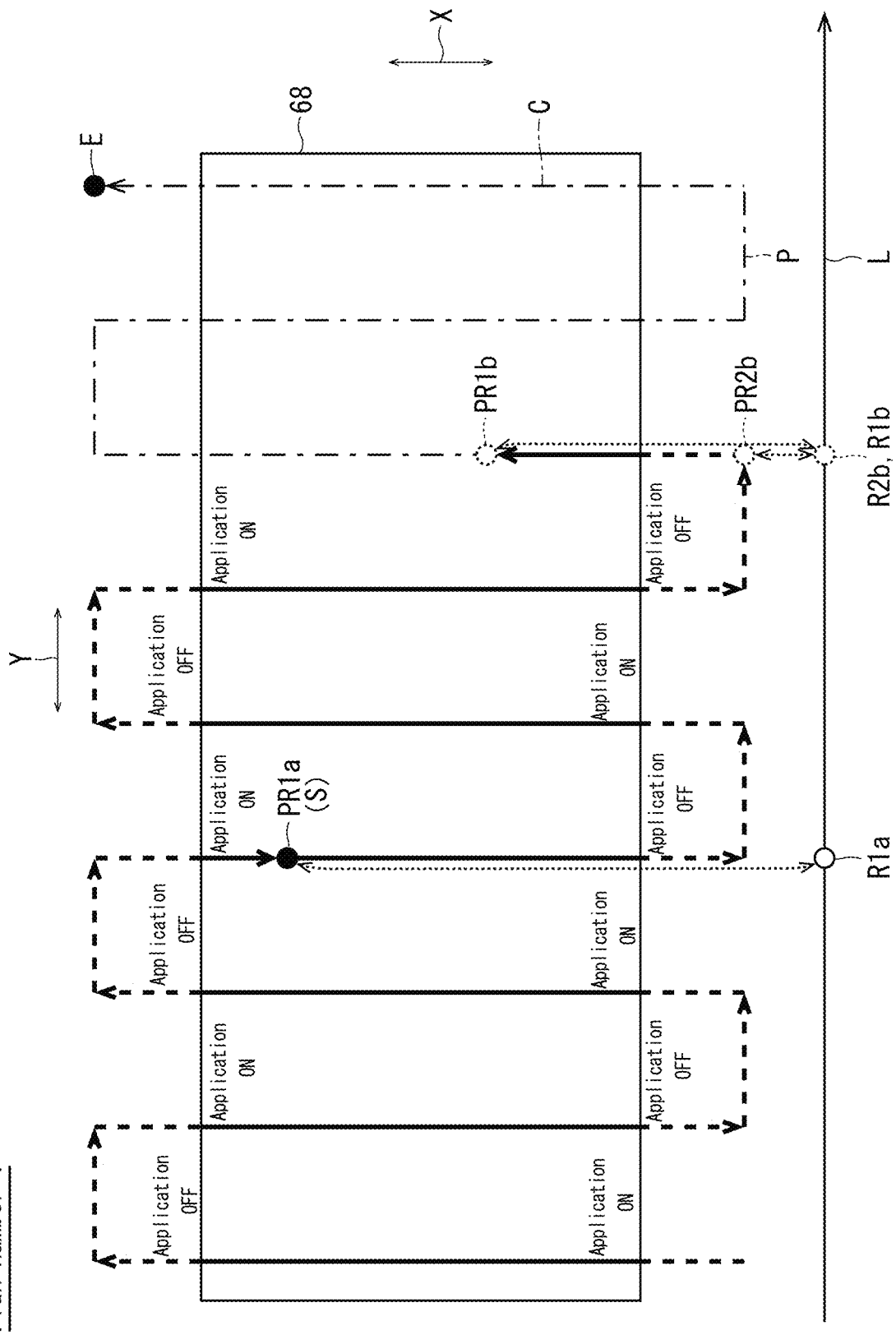
FIG. 8 is an illustrative drawing which shows a subsequent state of the plan number 1 replenishment plan pattern.

Referring now to FIG. 8, the memory 24b stores, as information of the duplication-source, i.e., the plan number 1 replenishment plan pattern, the first route replenishment point PR1a, the first replenishment point R1a, and the first time; and in addition, the in-travel replenishment time (which is equal to the first time at this point), the replenishment count (which is one at this point), and the replenishment due time. Likewise, referring now to FIG. 7, the memory 24b stores, as information of the duplicate, i.e., the plan number 2 replenishment plan pattern, the second route replenishment point PR2a, the second replenishment point R2a, and the second time; and in addition, the in-travel replenishment time (which is equal to the second time at this point), the replenishment count (which is one at this point), and the replenishment due time. Further, in the plan number 1 replenishment plan pattern shown in FIG. 8, the first route replenishment point PR1a is taken as the next travel start point S. In the plan number 2 replenishment plan pattern shown in FIG. 7, the second route replenishment point PR2a is taken as the next travel start point S, and these points are stored in the memory 24b.

Next, the replenishment plan pattern which is the current object to work on is plan number 1. The number of replenishment plan patterns made so far is two, and they are not equal. Therefore, the plan number is increased by an increment of one, and the plan number 2 replenishment plan pattern shown in FIG. 7 is taken as the object to work on, to which the process described above is performed in the same way as to the plan number 1 replenishment plan pattern.

First, as shown in FIG. 7, using the second route replenishment point PR2a as the travel start point S, the CPU 24a obtains the first route replenishment point PR1b on the travel route P. Since the first route replenishment point PR1b has not reached the travel end point E of the travel route P, the CPU 24a obtains the second route replenishment point PR2b. Also, the CPU 24a calculates a position on the replenishment line L which is closest from the first route replenishment point PR1b as the first replenishment point R1b, and a position which is closest from the second route replenishment point PR2b as the second replenishment point R2b. Further, the CPU 24a calculates the first time which is an amount of time necessary for the unmanned helicopter 100 to move from the latest travel start point S (the second route replenishment point PR2a) to the first route replenishment point PR1b, to make a round trip between the first route replenishment point PR1b and the first replenishment point R1b, and to replenish the chemical at the first replenishment point R1b. Likewise, the CPU 24a calculates the second time which is an amount of time necessary for the unmanned helicopter 100 to move from the latest travel start point S (the second route replenishment point PR2a) to the second route replenishment point PR2b, to make a round trip between the second route replenishment point PR2b and the second replenishment point R2b, and to replenish the chemical at the second replenishment point R2b.

Figure 9:
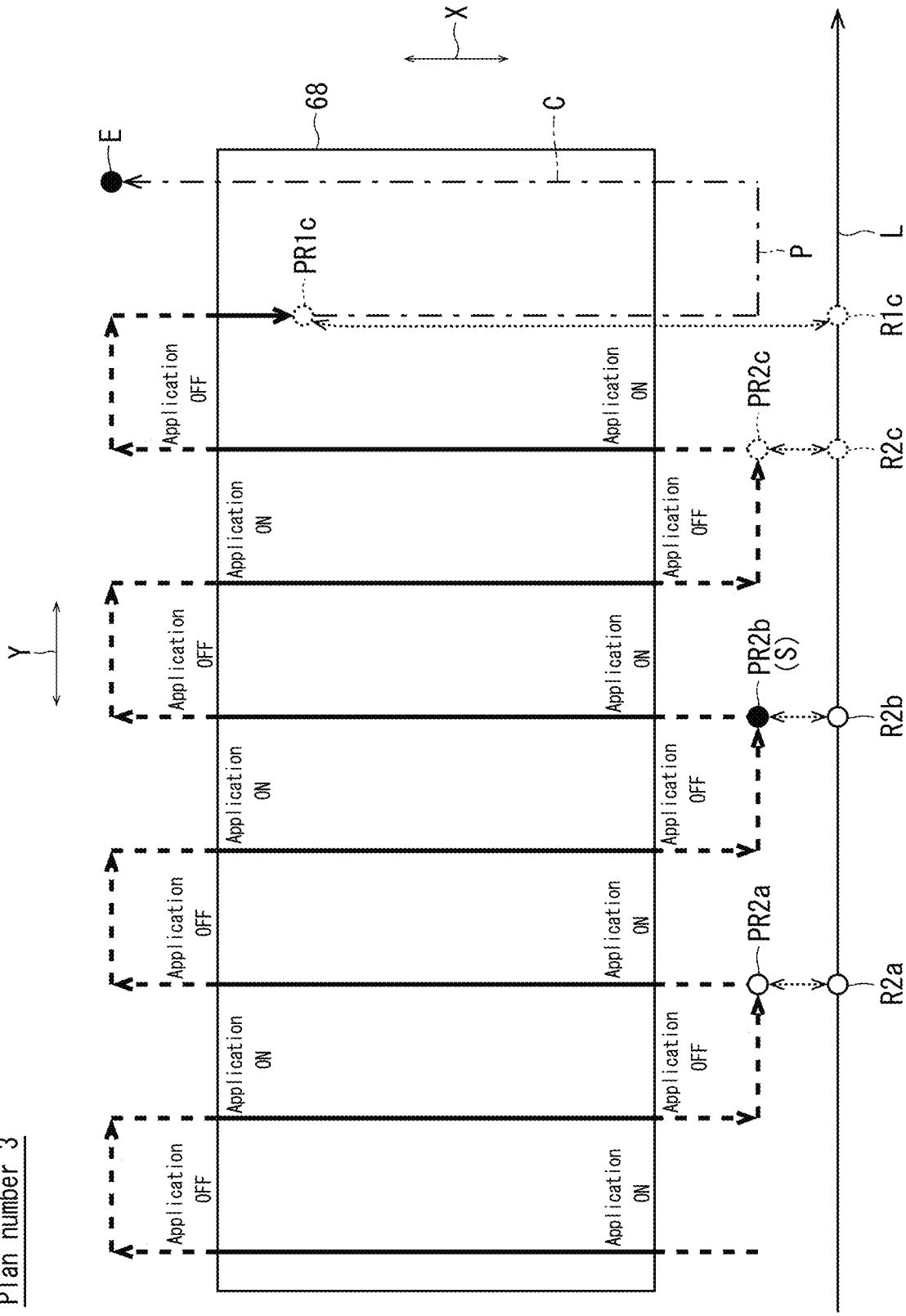
FIG. 9 is an illustrative drawing which shows a state of a plan number 3 replenishment plan pattern.

Thereafter, the CPU 24a makes a copy of the plan number 2 replenishment plan pattern shown in FIG. 7, such that a plan number 3 replenishment plan pattern shown in FIG. 9 is obtained.

Figure 10:
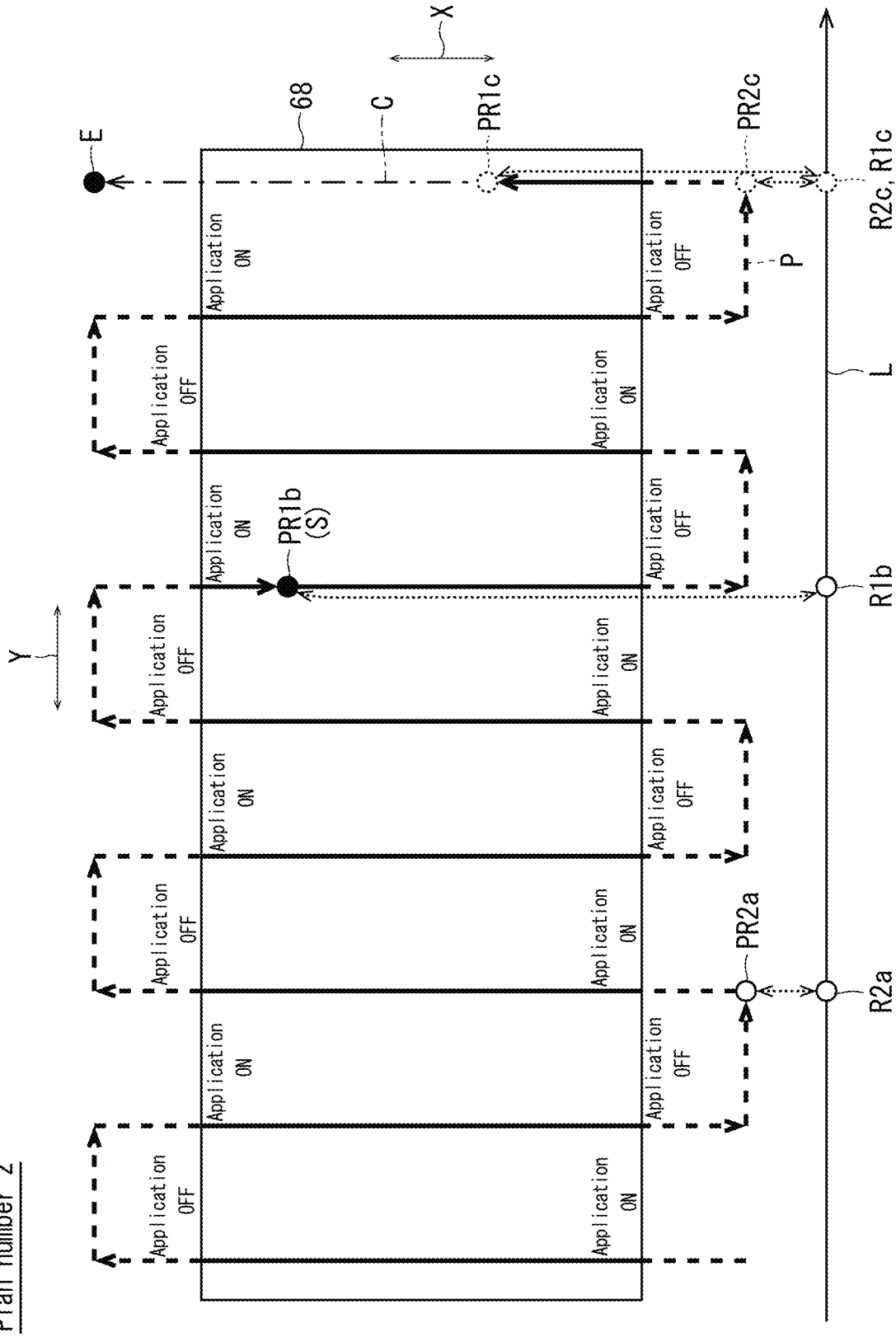
FIG. 10 is an illustrative drawing which shows a subsequent state of the plan number 2 replenishment plan pattern.

Referring now to FIG. 10, the memory 24b stores, as information of the duplication-source, i.e., the plan number 2 replenishment plan pattern, the first route replenishment point PR1b, the first replenishment point R1b, and the first time; and in addition, a new in-travel replenishment time obtained by adding the current first time to the previous in-travel replenishment time, the replenishment count (which is two at this point), and the replenishment due time. Likewise, referring to FIG. 9, the memory 24b stores, as information of the duplicate, i.e., the plan number 3 replenishment plan pattern, the second route replenishment point PR2b, the second replenishment point R2b, and the second time; and in addition, a new in-travel replenishment time obtained by adding the current second time to the previous in-travel replenishment time, the replenishment count (which is two at this point), and the replenishment due time. Further, in the plan number 2 replenishment plan pattern shown in FIG. 10, the first route replenishment point PR1b is taken as the next travel start point S. In the plan number 3 replenishment plan pattern shown in FIG. 9, the second route replenishment point PR2b is taken as the next travel start point S, and these points are stored in the memory 24b.

Next, the replenishment plan pattern which is the current object to work on is plan number 2. The number of replenishment plan patterns made so far is three, and they are not equal. Therefore, the plan number is increased by an increment of one, and the plan number 3 replenishment plan pattern shown in FIG. 9 is taken as the object to work on, to which the process described above is performed in the same way as to the plan number 2 replenishment plan pattern.

First, as shown in FIG. 9, using the second route replenishment point PR2b as the travel start point S, the CPU 24a obtains the first route replenishment point PR1c on the travel route P. Since the first route replenishment point PR1c has not reached the travel end point E of the travel route P, the CPU 24a obtains the second route replenishment point PR2c. Also, the CPU 24a calculates a position on the replenishment line L which is closest from the first route replenishment point PR1c as the first replenishment point R1c, and a position which is closest from the second route replenishment point PR2c as the second replenishment point R2c. Further, the CPU 24a calculates the first time which is an amount of time necessary for the unmanned helicopter 100 to move from the latest travel start point S (the second route replenishment point PR2b) to the first route replenishment point PR1c, to make a round trip between the first route replenishment point PR1c and the first replenishment point R1c, and to replenish the chemical at the first replenishment point R1c. Likewise, the CPU 24a calculates the second time which is an amount of time necessary for the unmanned helicopter 100 to move from the latest travel start point S (the second route replenishment point PR2b) to the second route replenishment point PR2c, to make a round trip between the second route replenishment point PR2c and the second replenishment point R2c, and to replenish the chemical at the second replenishment point R2c.

Figure 11:
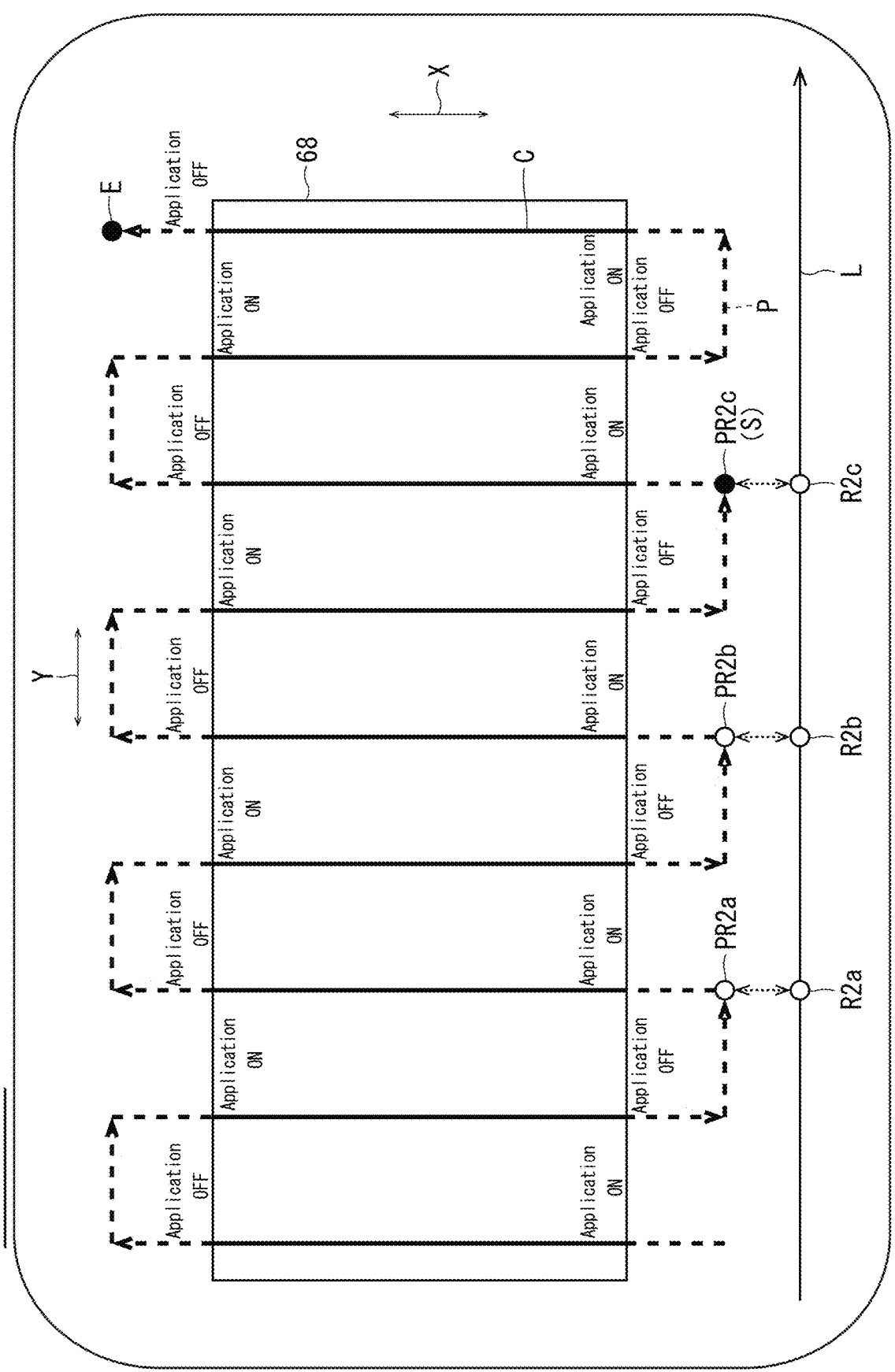
FIG. 11 is an illustrative drawing which shows a completed state of a plan number 4 replenishment plan pattern.

Thereafter, the CPU 24a makes a copy of the plan number 3 replenishment plan pattern shown in FIG. 9, such that a plan number 4 replenishment plan pattern shown in FIG. 11 is obtained.

Figure 12:
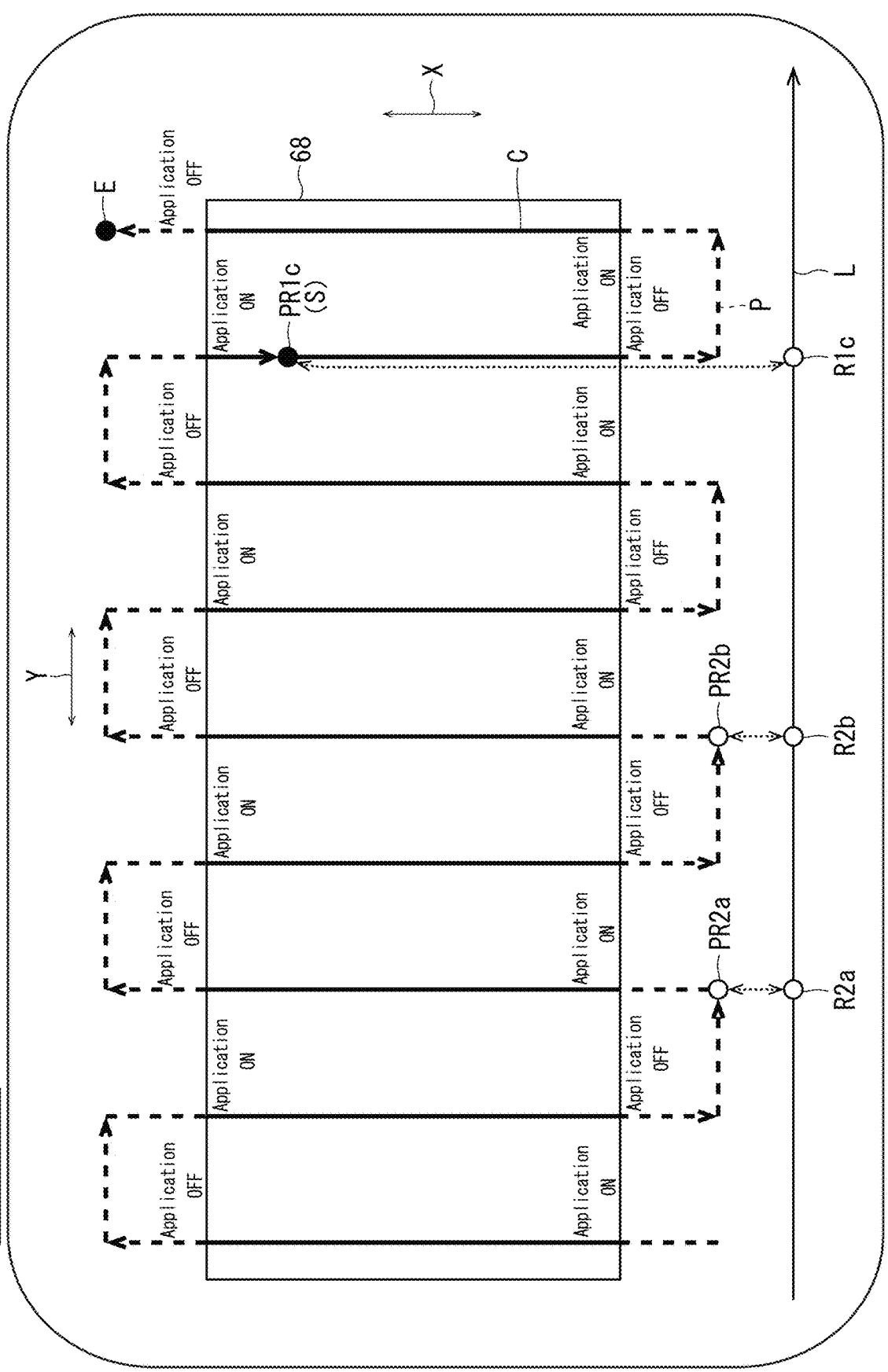
FIG. 12 is an illustrative drawing which shows a completed state of the plan number 3 replenishment plan pattern.

Referring now to FIG. 12, the memory 24b stores, as information of the duplication-source, i.e., the plan number 3 replenishment plan pattern, the first route replenishment point PR1c, the first replenishment point R1c, and the first time; and in addition, a new in-travel replenishment time obtained by adding the current first time to the previous in-travel replenishment time, the replenishment count (which is three at this point), and the replenishment due time. Likewise, referring to FIG. 11, the memory 24b stores, as information of the duplicate, i.e., the plan number 4 replenishment plan pattern, the second route replenishment point PR2c, the second replenishment point R2c, and the second time; and in addition, a new in-travel replenishment time obtained by adding the current second time to the previous in-travel replenishment time, the replenishment count (which is three at this point), and the replenishment due time. Further, in the plan number 3 replenishment plan pattern shown in FIG. 12, the first route replenishment point PR1c is taken as the next travel start point S. In the plan number 4 replenishment plan pattern shown in FIG. 11, the second route replenishment point PR2c is taken as the next travel start point S, and these points are stored in the memory 24b.

Next, the replenishment plan pattern which is the current object to work on is plan number 3. The number of replenishment plan patterns made so far is four, and they are not equal. Therefore, the plan number is increased by an increment of one, and the plan number 4 replenishment plan pattern shown in FIG. 11 is taken as the object to work on, to which the process is performed.

First, using the second route replenishment point PR2c as the travel start point S, the CPU 24a obtains the first route replenishment point on the travel route P. The first route replenishment point has reached the travel end point E of the travel route P (see FIG. 11). Therefore, the CPU 24a adds the amount of travel time from the travel start point S (the second route replenishment point PR2c) to the travel end point E, i.e., the final travel time to the accumulated in-travel replenishment time; more specifically, a total in-travel replenishment time is calculated, and the travel start point S is taken as the travel end point E. Then, for the plan number 4 replenishment plan pattern, the memory 24b further stores the final travel time and the total in-travel replenishment time, and in addition, the operation that the travel start point S was made equal to the travel end point E, such that the plan number 4 replenishment plan pattern shown in FIG. 11 is complete.

Next, the replenishment plan pattern which is the current object to work on is plan number 4, which is equal to the number of replenishment plan patterns made so far, i.e., four. Therefore, back to the plan number 1 replenishment plan pattern shown in FIG. 8, this replenishment plan pattern is taken as the object, to which the process described above is performed.

First, as shown in FIG. 8, using the first route replenishment point PR1a as the travel start point S, the CPU 24a obtains the first route replenishment point PR1b on the travel route P. Since the first route replenishment point PR1b has not reached the travel end point E of the travel route P, the CPU 24a obtains the second route replenishment point PR2b. Also, the CPU 24a calculates a position on the replenishment line L which is closest from the first route replenishment point PR1b as the first replenishment point R1b, and a position which is closest from the second route replenishment point PR2b as the second replenishment point R2b. In this example, the first replenishment point R1b and the second replenishment point R2b are located at the same position. Further, the CPU 24a calculates the first time which is an amount of time necessary for the unmanned helicopter 100 to move from the latest travel start point S (the first route replenishment point PR1a) to the first route replenishment point PR1b, to make a round trip between the first route replenishment point PR1b and the first replenishment point R1b, and to replenish the chemical at the first replenishment point R1b. Likewise, the CPU 24a calculates the second time which is an amount of time necessary for the unmanned helicopter 100 to move from the latest travel start point S (the first route replenishment point PR1a) to the second route replenishment point PR2b, to make a round trip between the second route replenishment point PR2b and the second replenishment point R2b, and to replenish the chemical at the second replenishment point R2b.

Figure 13:
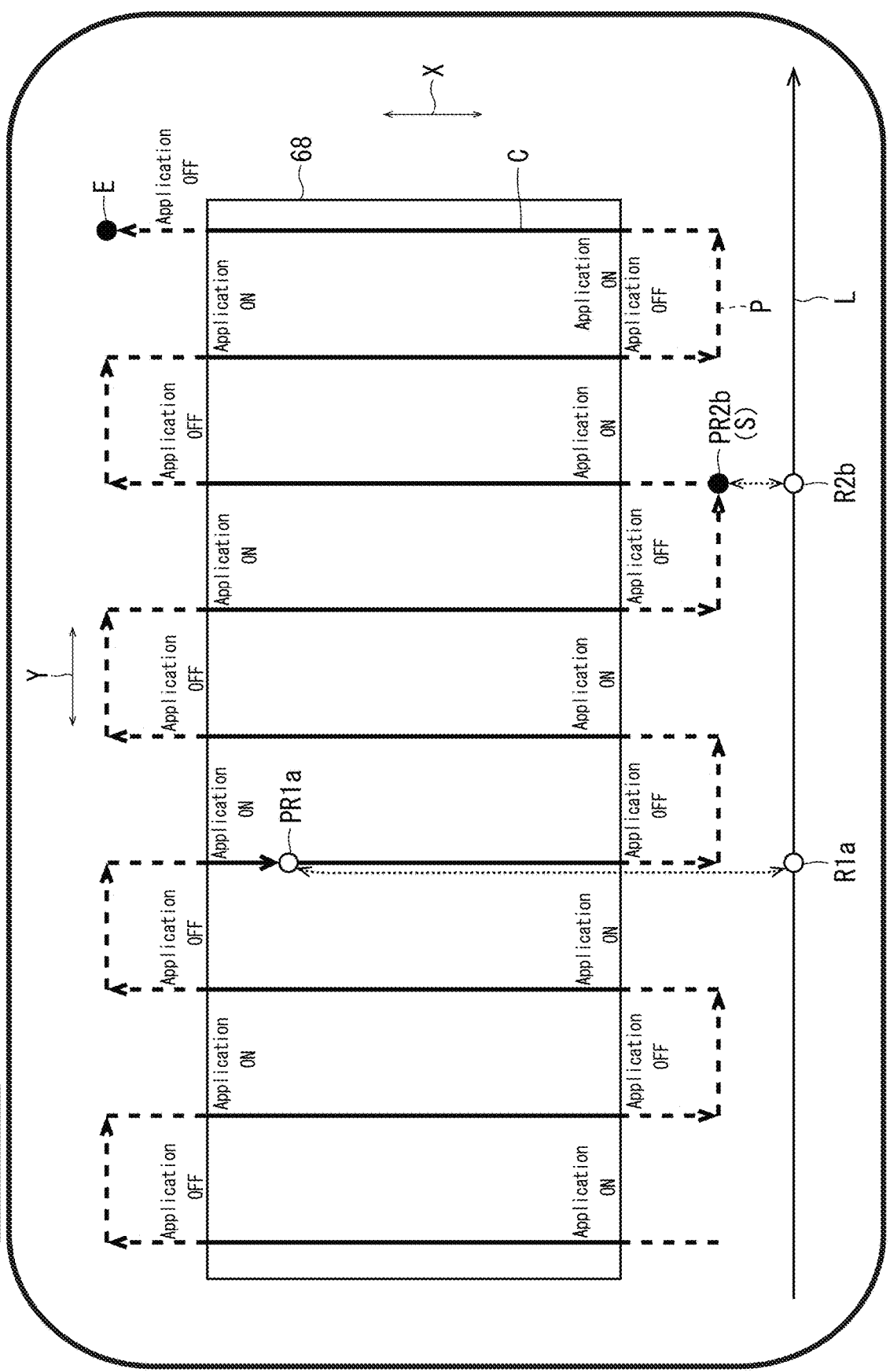
FIG. 13 is an illustrative drawing which shows a completed state of a plan number 5 replenishment plan pattern.

Thereafter, the CPU 24a makes a copy of the plan number 1 replenishment plan pattern shown in FIG. 8, such that a plan number 5 replenishment plan pattern shown in FIG. 13 is obtained.

Figure 14:
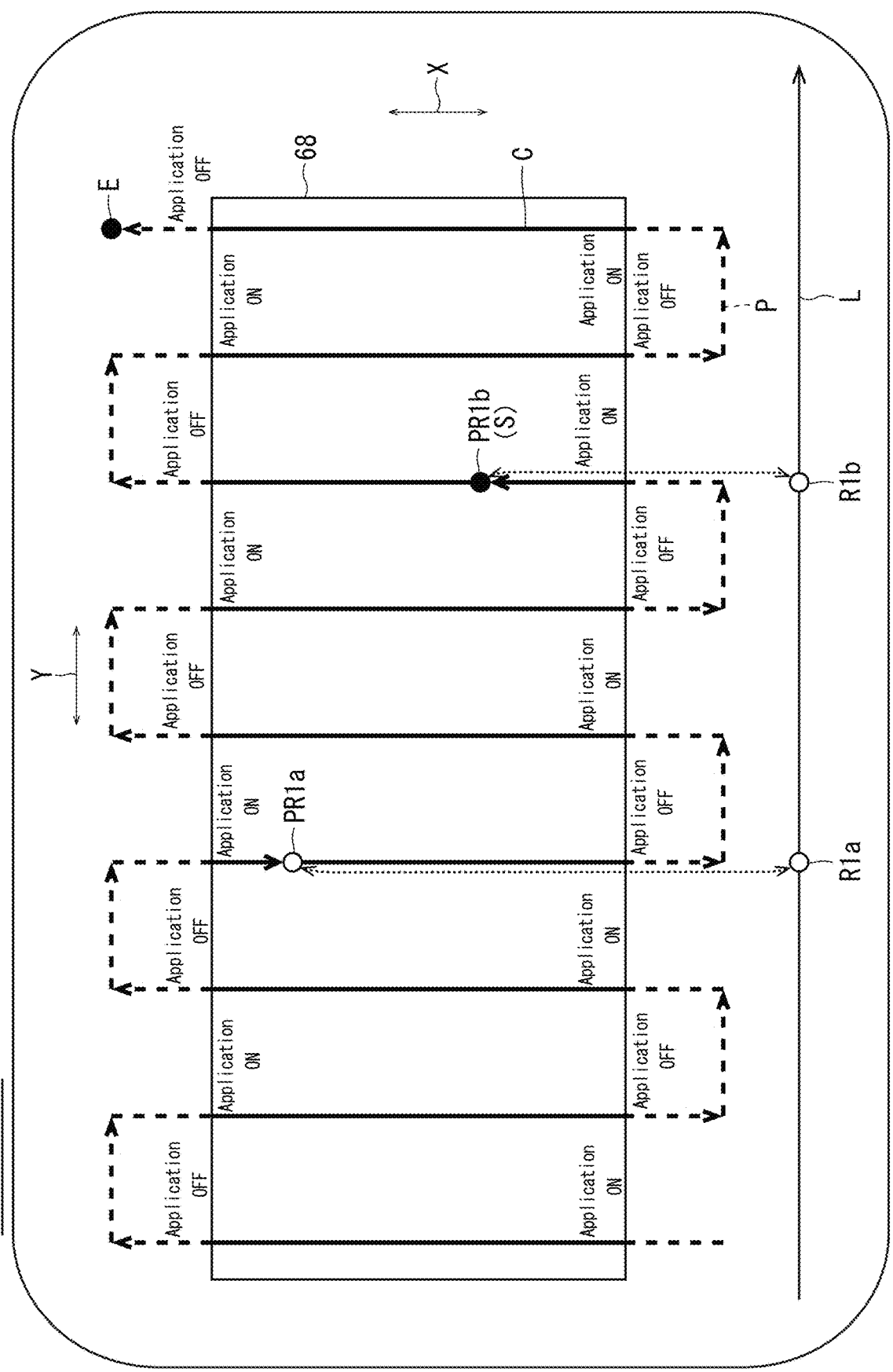
FIG. 14 is an illustrative drawing which shows a completed state of a plan number 1 replenishment plan pattern.

Referring now to FIG. 14, the memory 24b stores, as information of the duplication-source, i.e., the plan number 1 replenishment plan pattern, the first route replenishment point PR1b, the first replenishment point R1b, and the first time; and in addition, a new in-travel replenishment time obtained by adding the current first time to the previous in-travel replenishment time, the replenishment count (which is two at this point), and the replenishment due time. Likewise, referring to FIG. 13, the memory 24b stores, as information of the duplicate, i.e., the plan number 5 replenishment plan pattern, the second route replenishment point PR2b, the second replenishment point R2b, and the second time; and in addition, a new in-travel replenishment time obtained by adding the current second time to the previous in-travel replenishment time, the replenishment count (which is two at this point), and the replenishment due time. Further, in the plan number 1 replenishment plan pattern shown in FIG. 14, the first route replenishment point PR1b is taken as the next travel start point S. In the plan number 5 replenishment plan pattern shown in FIG. 13, the second route replenishment point PR2b is taken as the next travel start point S, and these points are stored in the memory 24b.

Next, the replenishment plan pattern which is the current object to work on is plan number 1. The number of replenishment plan patterns made so far is five, and they are not equal. Therefore, the plan number is increased by an increment of one, and the plan number 2 replenishment plan pattern shown in FIG. 10 is taken as the object to work on, to which the process is performed.

First, as shown in FIG. 10, using the first route replenishment point PR1b as the travel start point S, the CPU 24a obtains the first route replenishment point PR1c on the travel route P. Since the first route replenishment point PR1c has not reached the travel end point E of the travel route P, the CPU 24a obtains the second route replenishment point PR2c. Also, the CPU 24a calculates a position on the replenishment line L which is closest from the first route replenishment point PR1c as the first replenishment point R1c, and a position which is closest from the second route replenishment point PR2c as the second replenishment point R2c. In this example, the first replenishment point R1c and the second replenishment point R2c are located at the same position. Further, the CPU 24a calculates the first time which is an amount of time necessary for the unmanned helicopter 100 to move from the latest travel start point S (the first route replenishment point PR1b) to the first route replenishment point PR1c, to make a round trip between the first route replenishment point PR1c and the first replenishment point R1c, and to replenish the chemical at the first replenishment point R1c. Likewise, the CPU 24a calculates the second time which is an amount of time necessary for the unmanned helicopter 100 to move from the latest travel start point S (the first route replenishment point PR1b) to the second route replenishment point PR2c, to make a round trip between the second route replenishment point PR2c and the second replenishment point R2c, and to replenish the chemical at the second replenishment point R2c.

Figure 15:
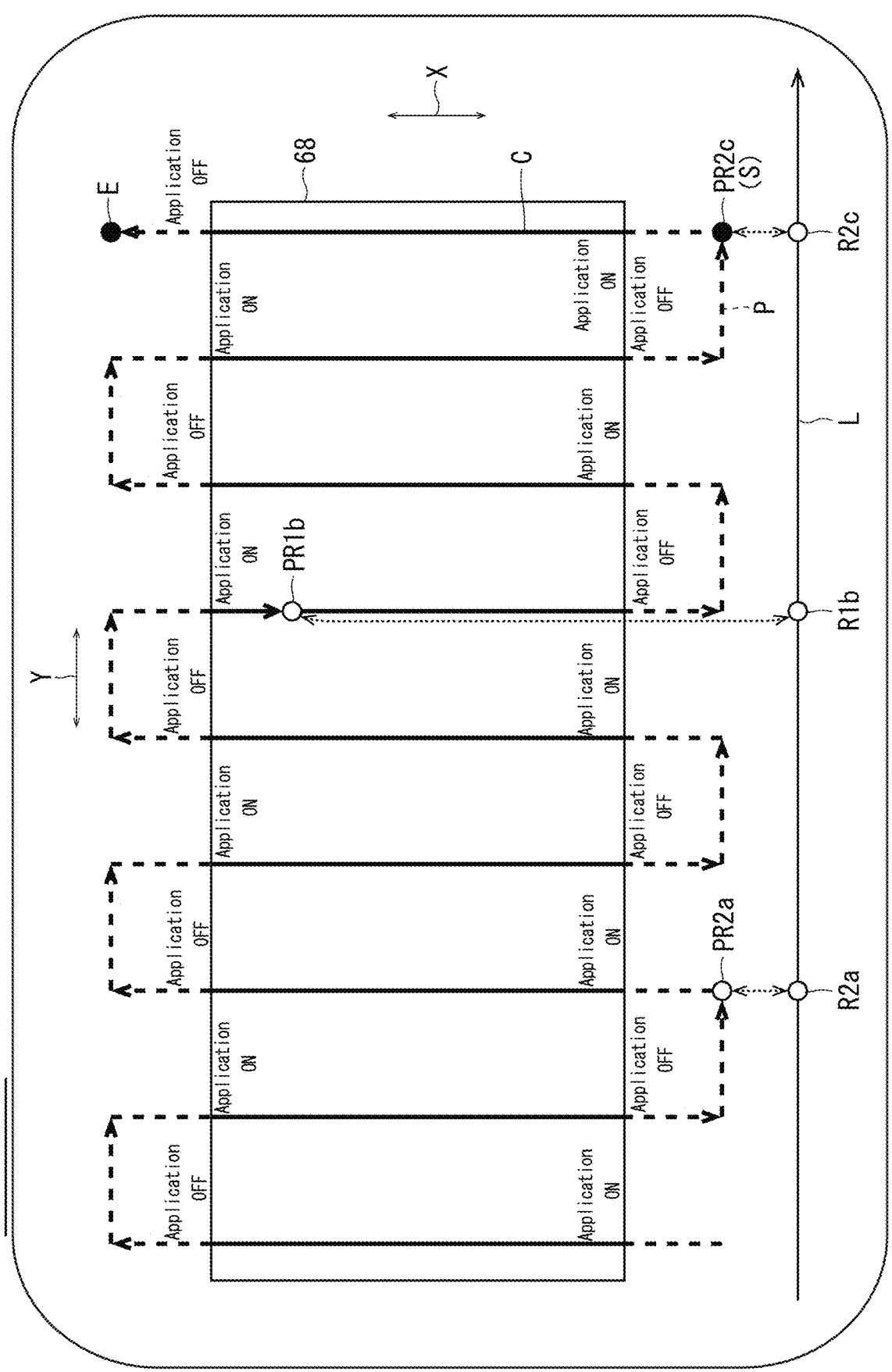
FIG. 15 is an illustrative drawing which shows a completed state of a plan number 6 replenishment plan pattern.

Thereafter, the CPU 24a makes a copy of the plan number 2 replenishment plan pattern shown in FIG. 10, such that a plan number 6 replenishment plan pattern shown in FIG. 15 is obtained.

Figure 16:
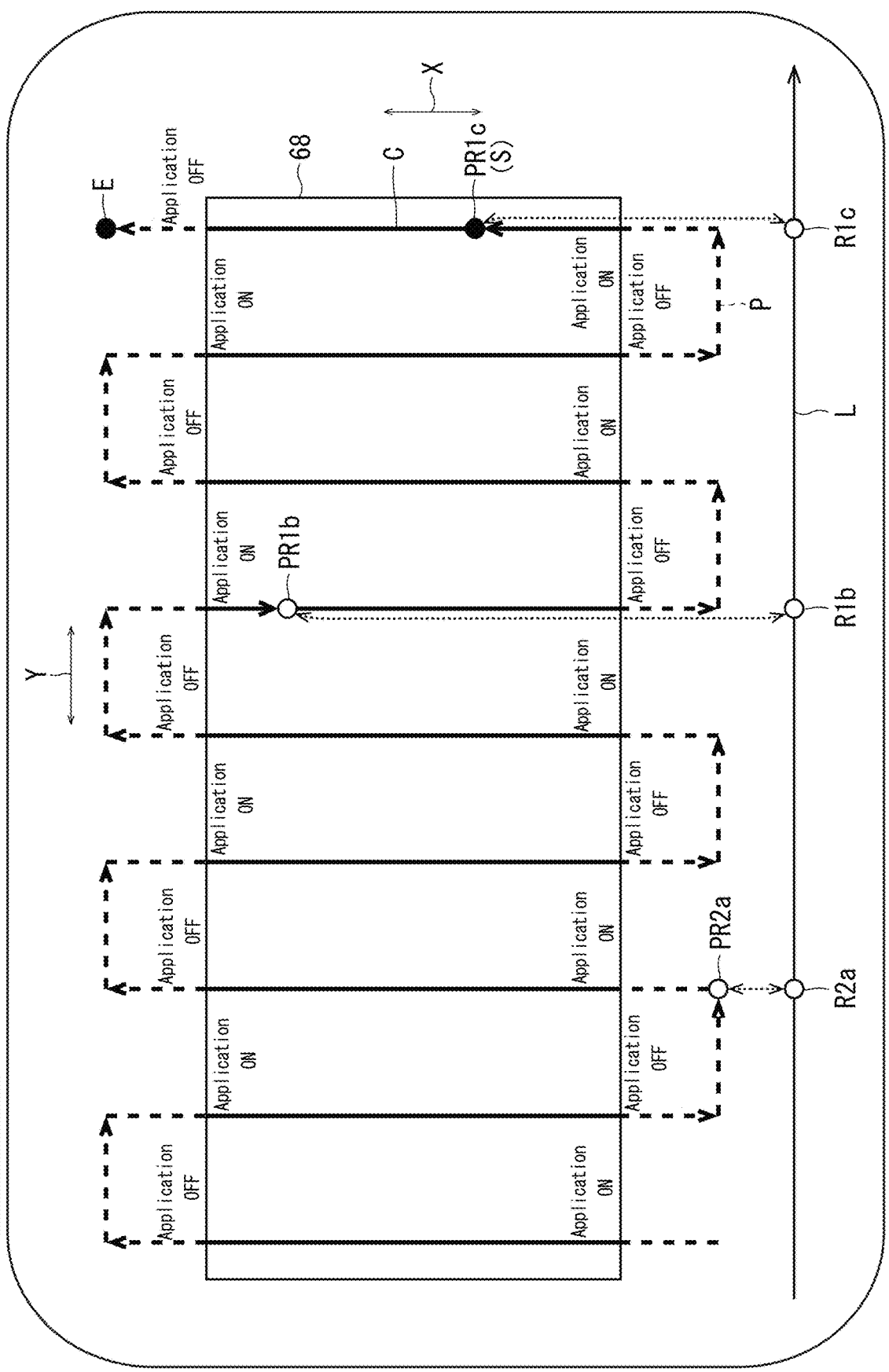
FIG. 16 is an illustrative drawing which shows a completed state of the plan number 2 replenishment plan pattern.
Figure 17:
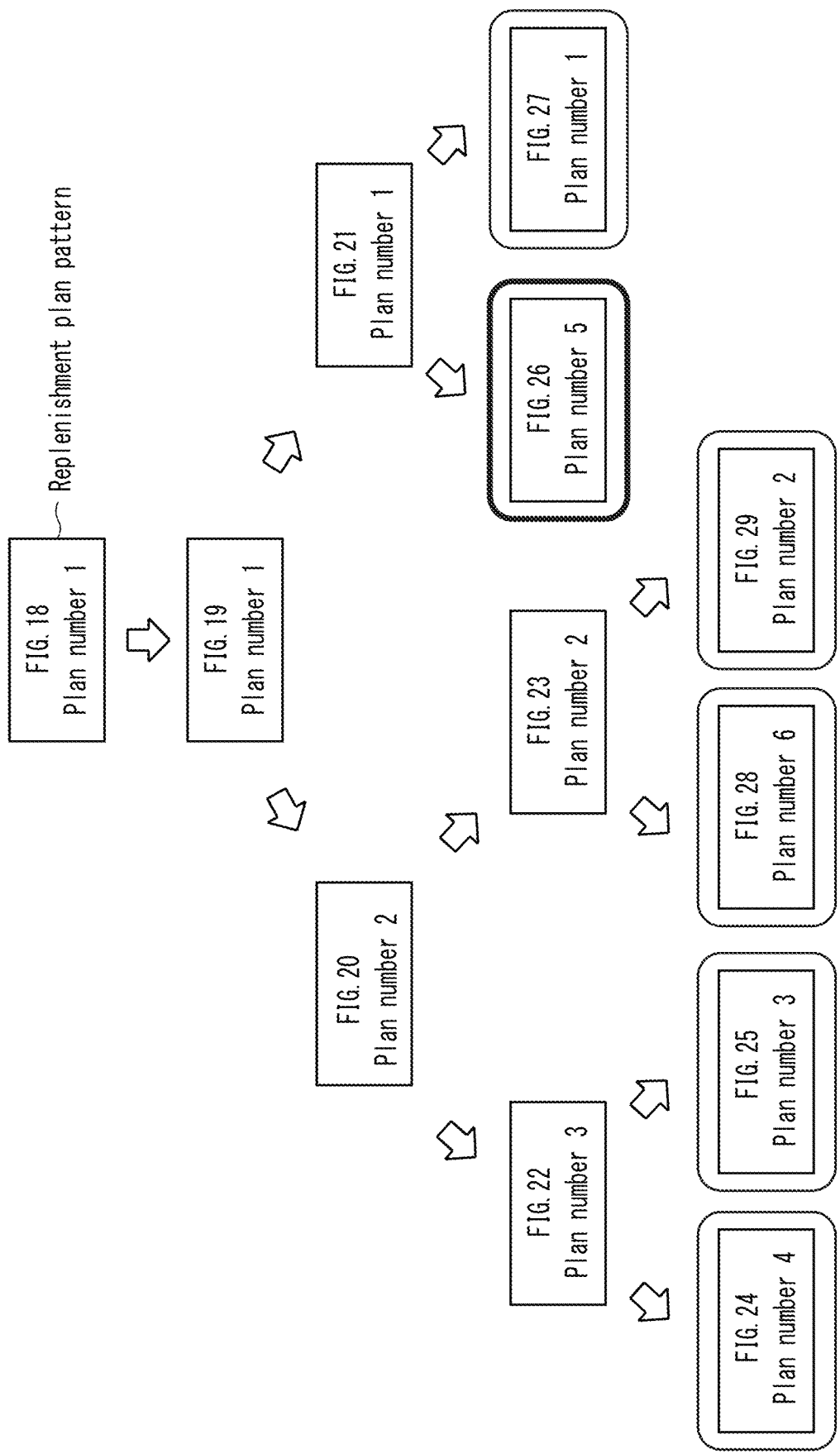
FIG. 17 is an illustrative drawing which shows another example of transitions when making replenishment plan patterns.
Figure 18:
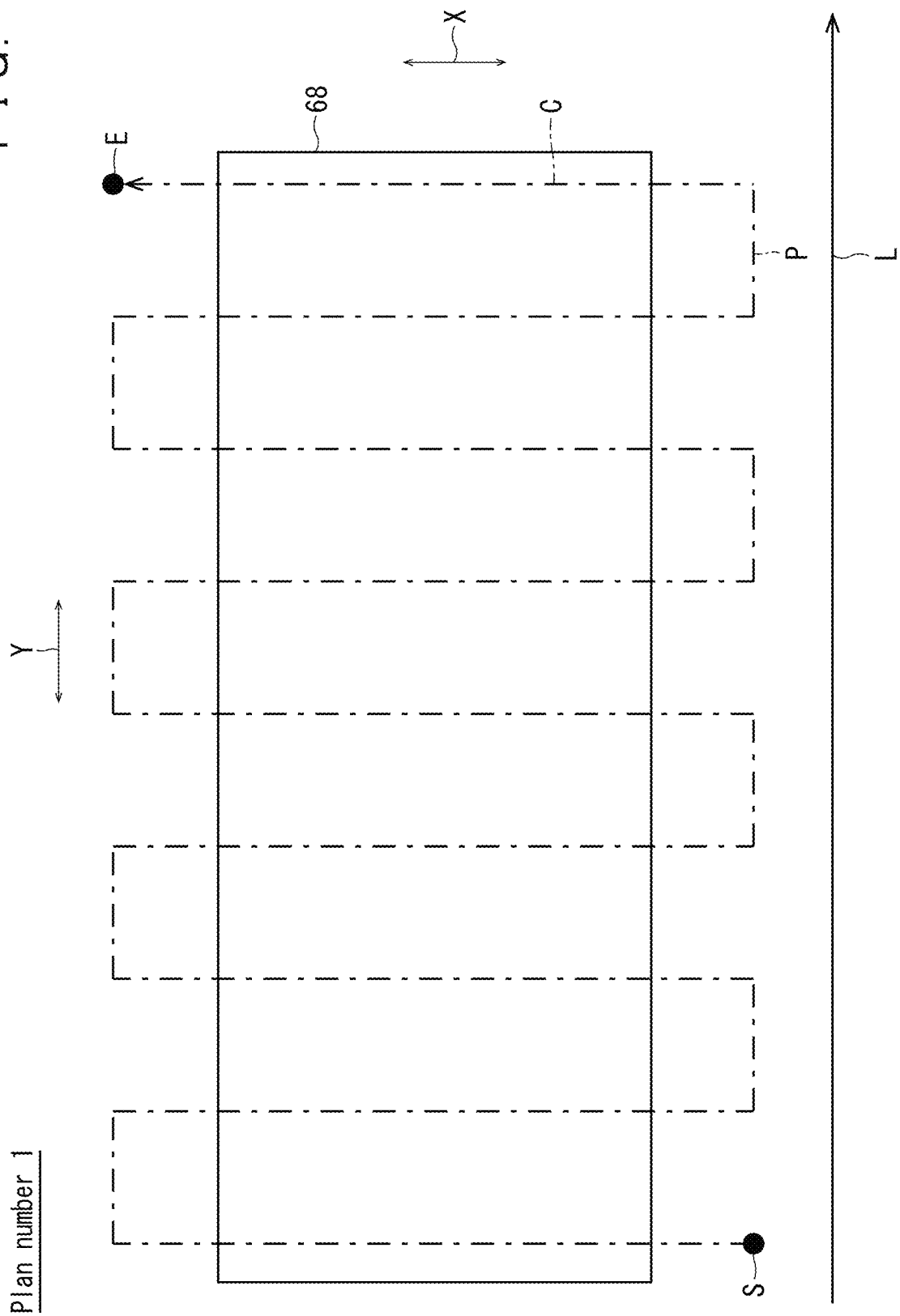
FIG. 18 is an illustrative drawing which shows an initial state of a plan number 1 replenishment plan pattern.
Figure 19:
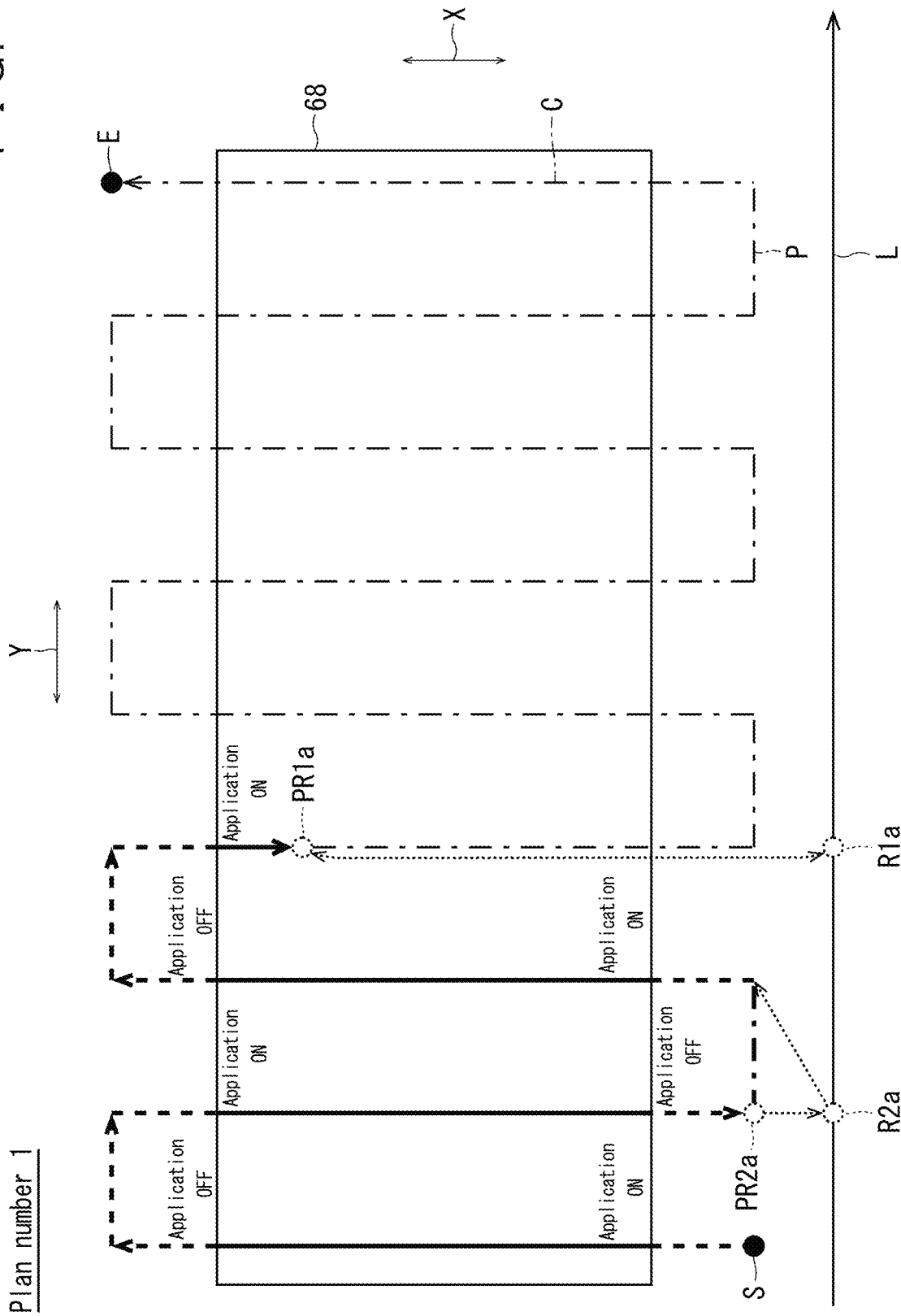
FIG. 19 is an illustrative drawing which shows a subsequent state of the plan number 1 replenishment plan pattern.
Figure 20:
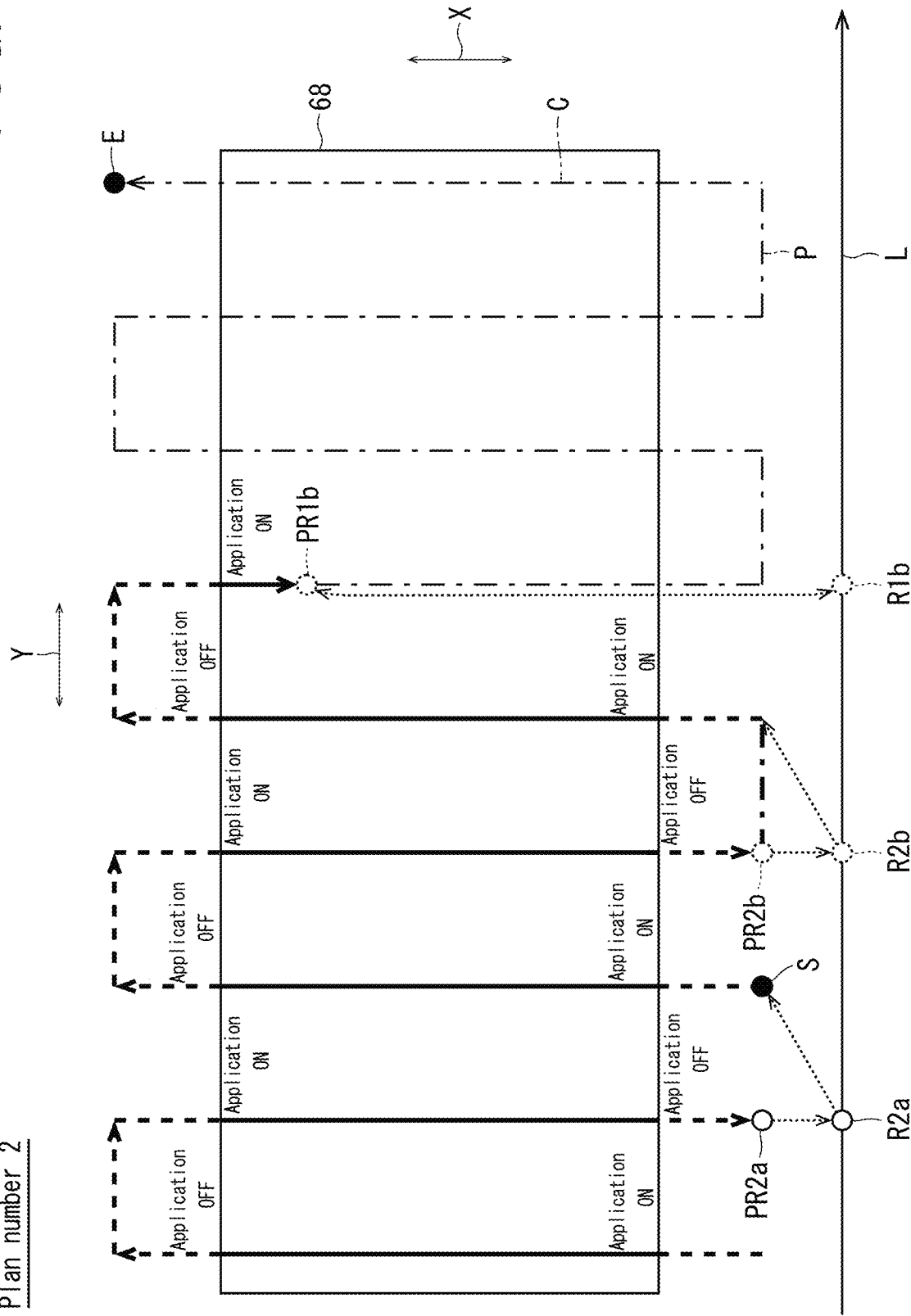
FIG. 20 is an illustrative drawing which shows a state of a plan number 2 replenishment plan pattern.
Figure 21:
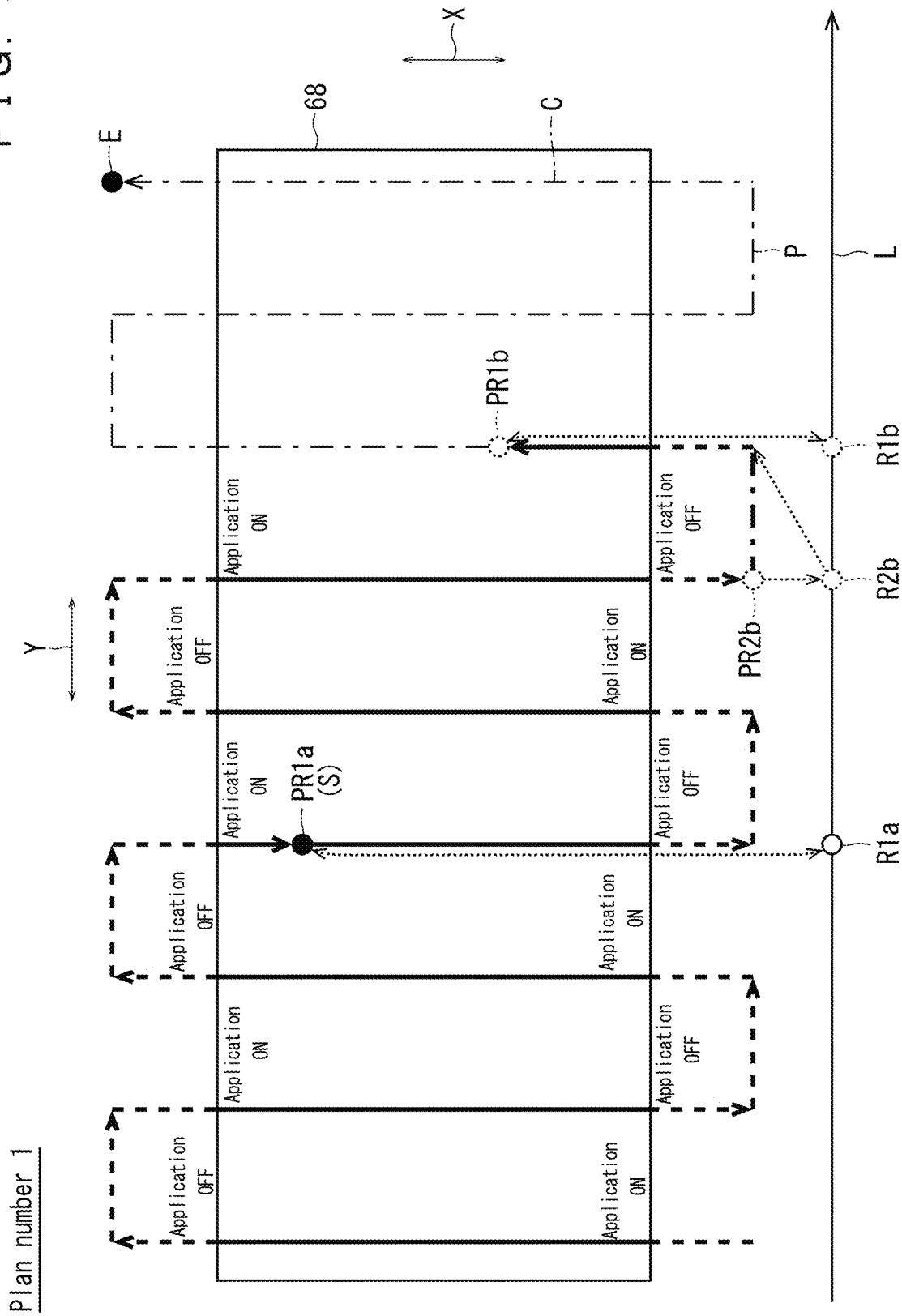
FIG. 21 is an illustrative drawing which shows a subsequent state of the plan number 1 replenishment plan pattern.
Figure 22:
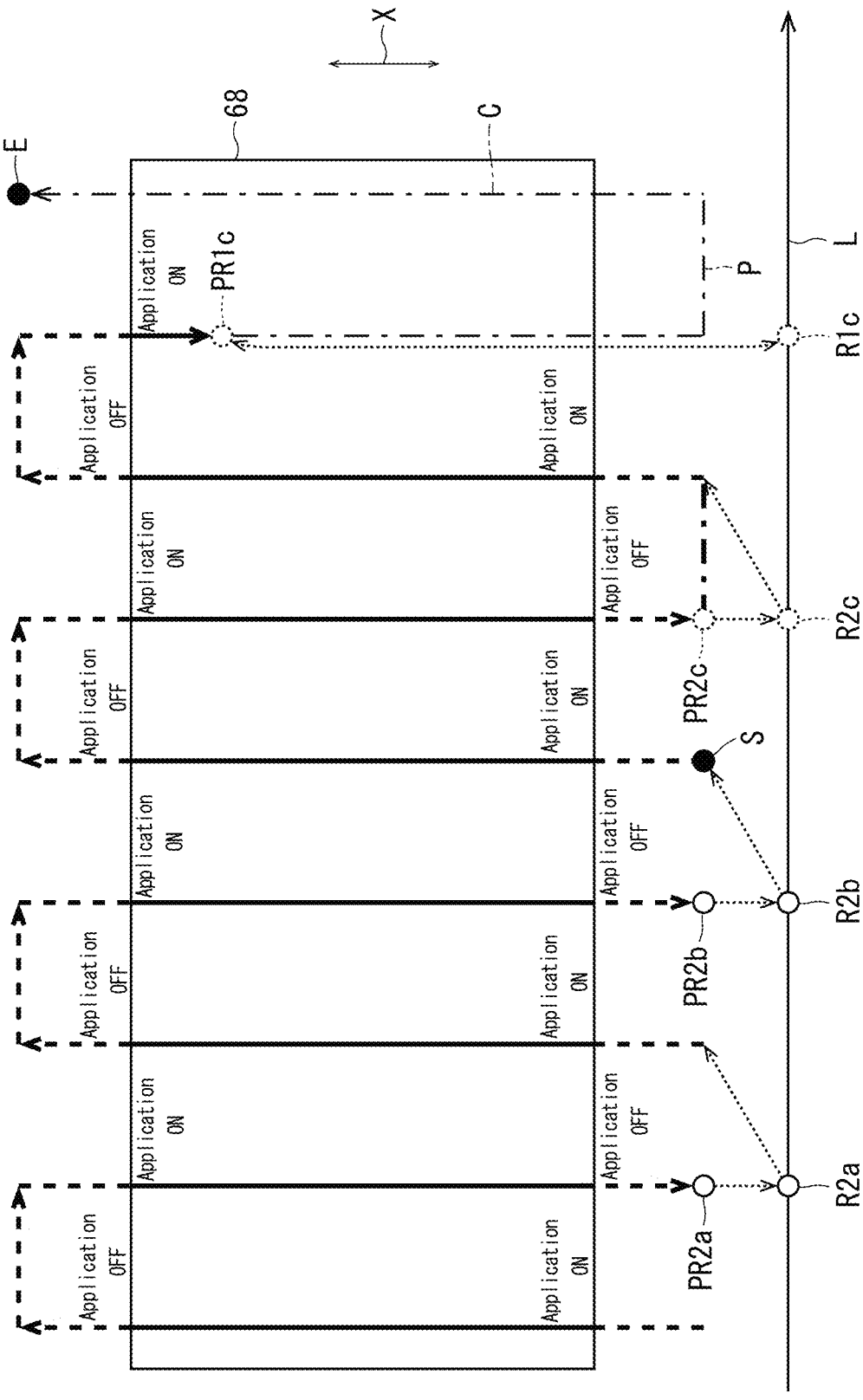
FIG. 22 is an illustrative drawing which shows a state of a plan number 3 replenishment plan pattern.
Figure 23:
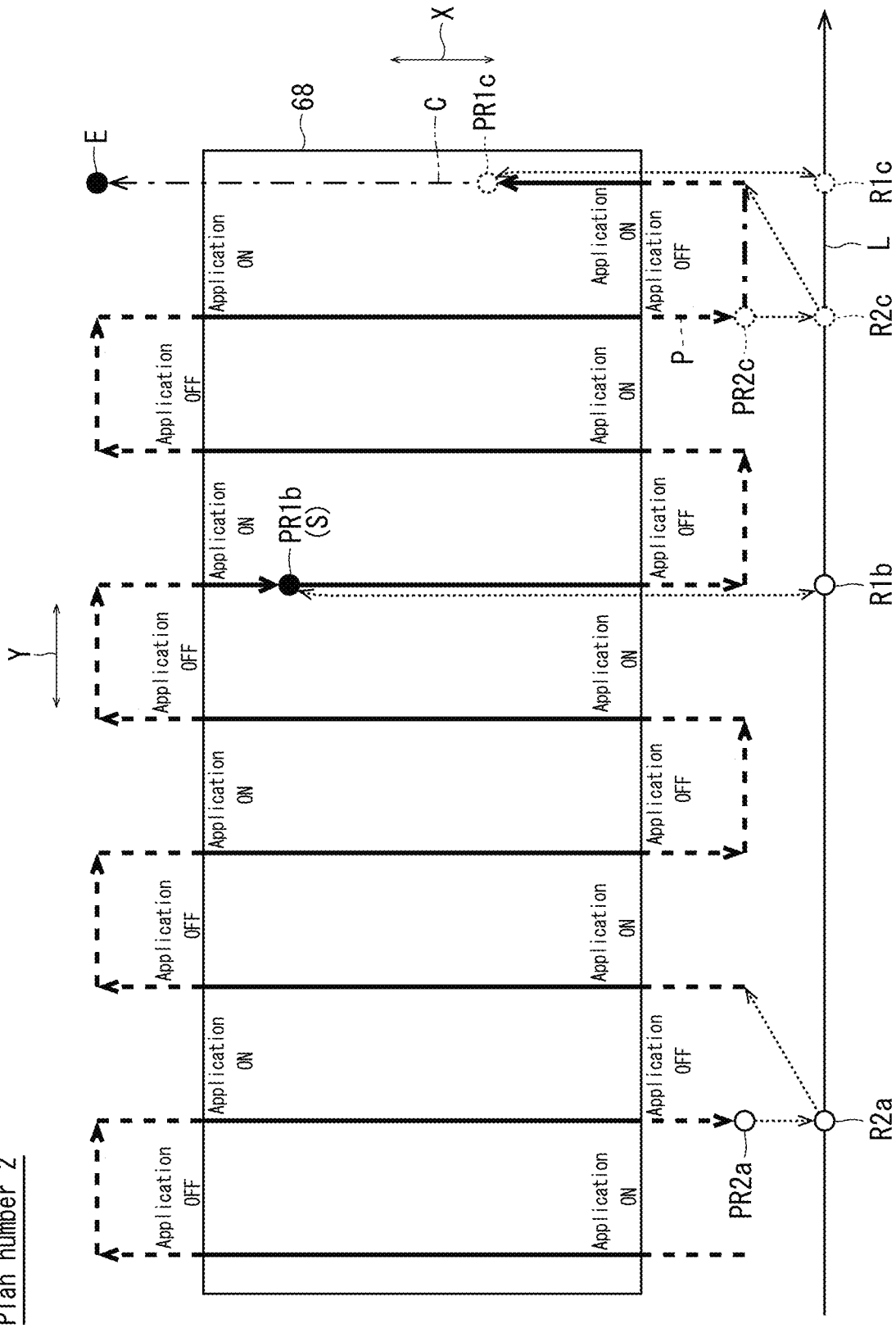
FIG. 23 is an illustrative drawing which shows a subsequent state of the plan number 2 replenishment plan pattern.
Figure 24:
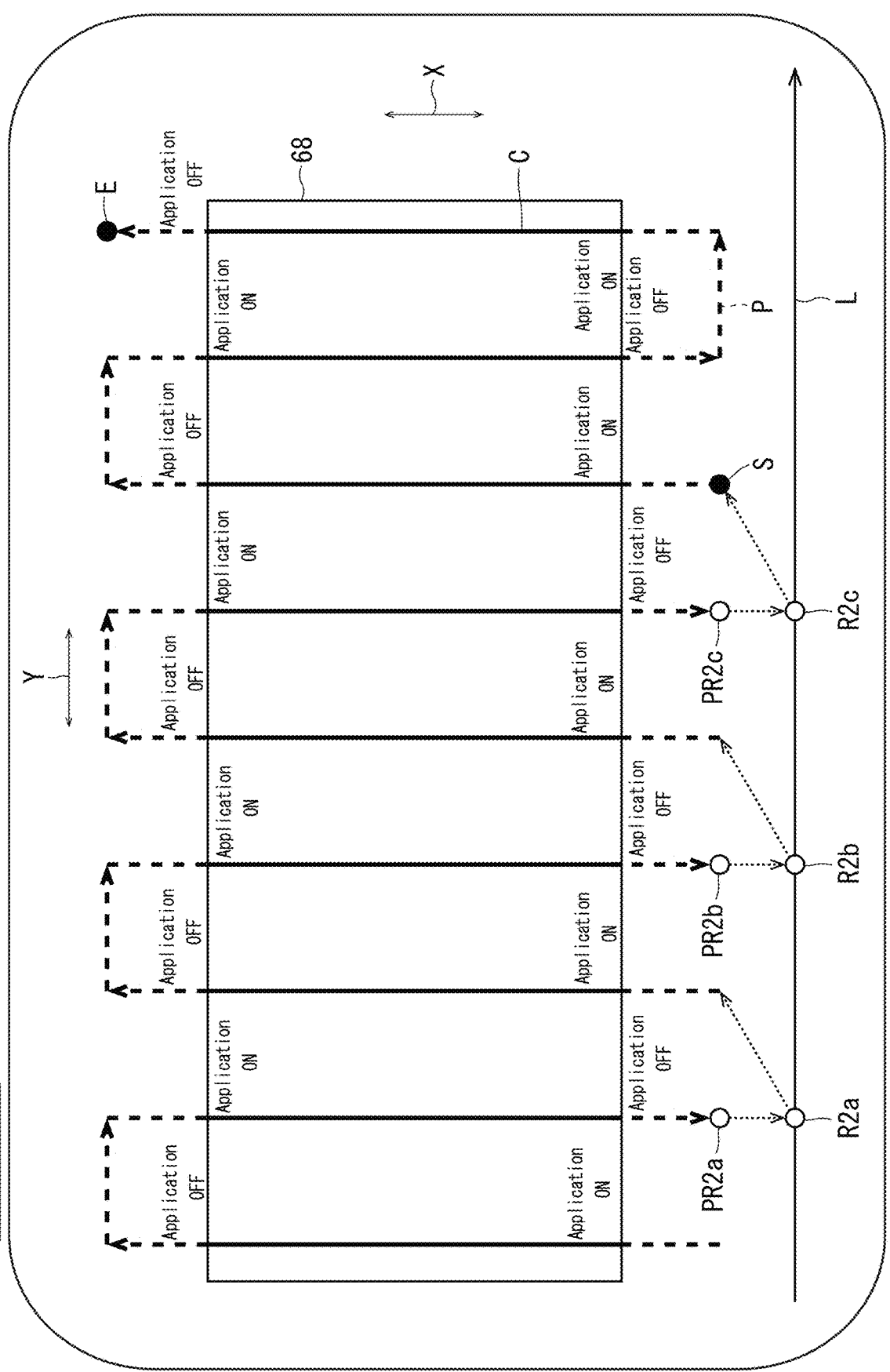
FIG. 24 is an illustrative drawing which shows a completed state of a plan number 4 replenishment plan pattern.
Figure 25:
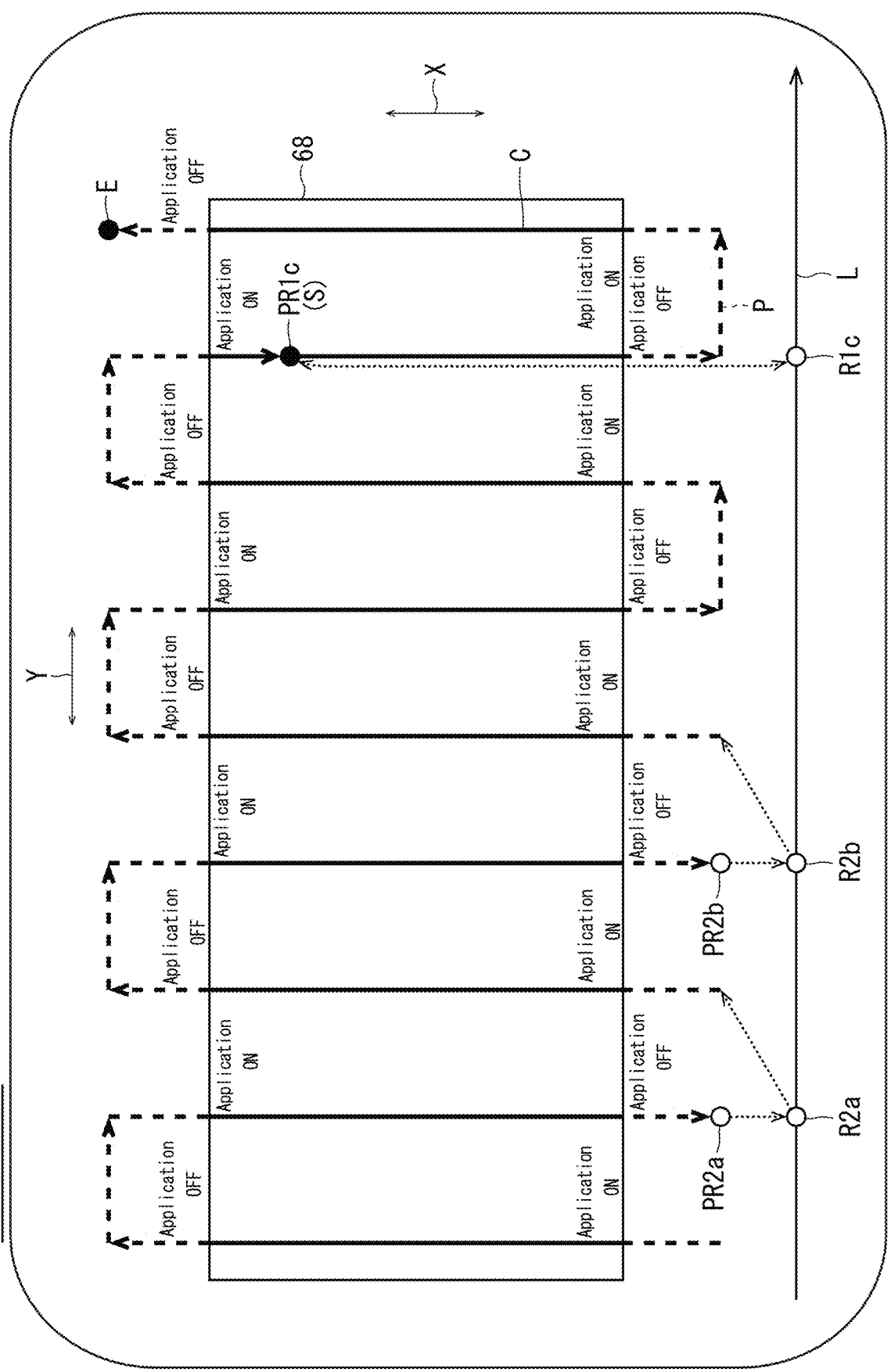
FIG. 25 is an illustrative drawing which shows a completed state of the plan number 3 replenishment plan pattern.
Figure 26:
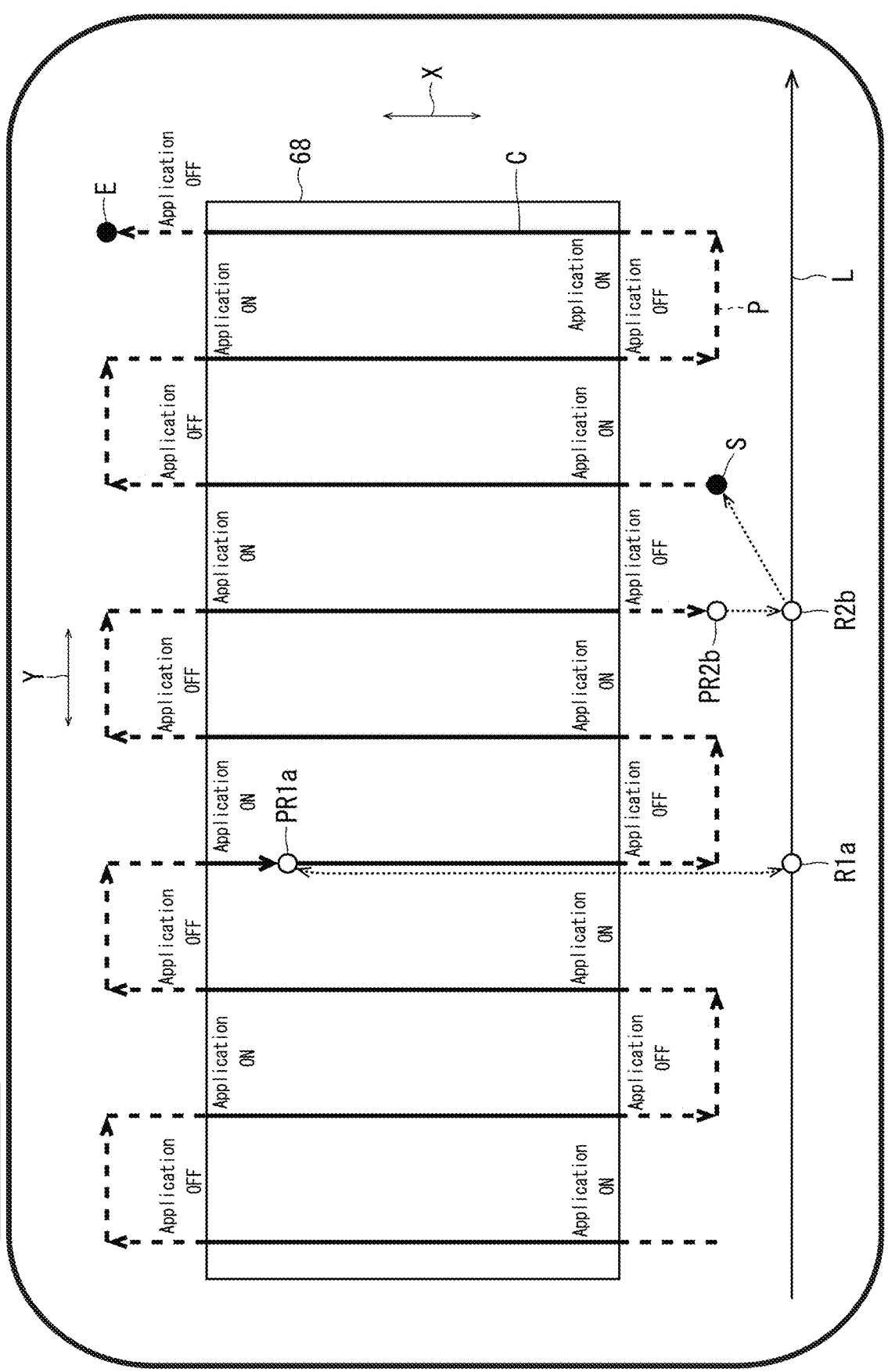
FIG. 26 is an illustrative drawing which shows a completed state of a plan number 5 replenishment plan pattern.
Figure 27:
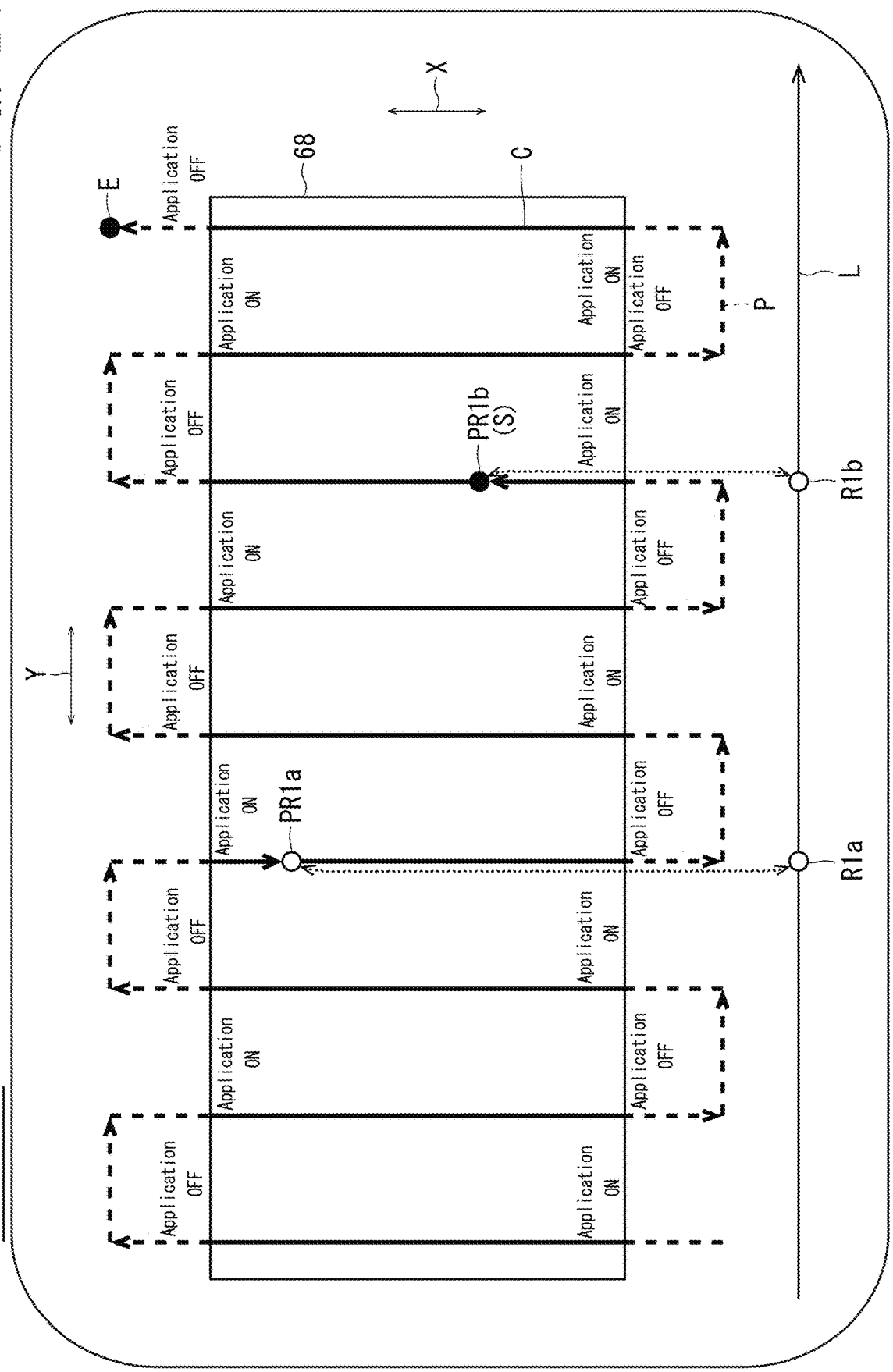
FIG. 27 is an illustrative drawing which shows a completed state of the plan number 1 replenishment plan pattern.

Referring now to FIG. 16, the memory 24b stores, as information of the duplication-source, i.e., the plan number 2 replenishment plan pattern, the first route replenishment point PR1c, the first replenishment point R1c, and the first time; and in addition, a new in-travel replenishment time obtained by adding the current first time to the previous in-travel replenishment time, the replenishment count (which is three at this point), and the replenishment due time. Likewise, referring to FIG. 15, the memory 24b stores, as information of the duplicate, i.e., the plan number 6 replenishment plan pattern, the second route replenishment point PR2c, the second replenishment point R2c, and the second time; and in addition, a new in-travel replenishment time obtained by adding the current second time to the previous in-travel replenishment time, the replenishment count (which is three at this point), and the replenishment due time. Further, in the plan number 2 replenishment plan pattern shown in FIG. 16, the first route replenishment point PR1c is taken as the next travel start point S. In the plan number 6 replenishment plan pattern shown in FIG. 15, the second route replenishment point PR2c is taken as the next travel start point S, and these points are stored in the memory 24b.

Next, the replenishment plan pattern which is the current object to work on is plan number 2. The number of replenishment plan patterns made so far is six, and they are not equal. Therefore, the plan number is increased by an increment of one, and the plan number 3 replenishment plan pattern shown in FIG. 12 is taken as the object to work on, to which the process is performed.

First, using the first route replenishment point PR1c as the travel start point S, the CPU 24a obtains the first route replenishment point on the travel route P. The first route replenishment point has reached the travel end point E of the travel route P (see FIG. 12). Therefore, the CPU 24a adds the amount of travel time from the travel start point S (the first route replenishment point PR1c) to the travel end point E, i.e., the final travel time to the accumulated in-travel replenishment time; more specifically, a total in-travel replenishment time is calculated, and the travel start point S is taken as the travel end point E. Then, for the plan number 3 replenishment plan pattern, the memory 24b further stores the final travel time and the total in-travel replenishment time, and in addition, the operation that the travel start point was made equal to the travel end point, such that the plan number 3 replenishment plan pattern shown in FIG. 12 is complete.

Next, the replenishment plan pattern which is the current object to work on is plan number 3, which is not equal to the number of replenishment plan patterns made so far, i.e., six. Therefore, the plan number is increased by an increment of one, and the process goes to the plan number 4 replenishment plan pattern. However, in the plan number 4 replenishment plan pattern, the travel start point S is equal to the travel end point E, which means that the replenishment planning process is already finished. Therefore, the process ignores this replenishment plan pattern, and determines whether or not the travel start point S is equal to the travel end point E in all of the replenishment plan patterns 1 through 6. At this point, the statement that the travel start point S and the travel end point E are equal to each other in all of the replenishment plan patterns 1 through 6 is not true, and therefore the process further proceeds.

The replenishment plan pattern which is the current object to work on is plan number 4, which is not equal to the number of replenishment plan patterns made so far, i.e., 6. Therefore, the plan number is increased by an increment of one, and the process goes to the plan number 5 replenishment plan pattern shown in FIG. 13. Then, this replenishment plan pattern is processed.

First, using the second route replenishment point PR2b as the travel start point S, the CPU 24a obtains the first route replenishment point on the travel route P. The first route replenishment point has reached the travel end point E of the travel route P (see FIG. 13). Therefore, the CPU 24a adds the amount of travel time from the travel start point S (the second route replenishment point PR2b) to the travel end point E, i.e., the final travel time to the accumulated in-travel replenishment time; more specifically, a total in-travel replenishment time is calculated, and the travel start point S is taken as the travel end point E. Then, for the plan number 5 replenishment plan pattern, the memory 24b further stores the final travel time and the total in-travel replenishment time, and in addition, the operation that the travel start point S was made equal to the travel end point E, such that the plan number 5 replenishment plan pattern shown in FIG. 13 is complete.

Next, the replenishment plan pattern which is the current object to work on is plan number 5, which is not equal to the number of replenishment plan patterns made so far, i.e., six. Therefore, the plan number is increased by an increment of one, and the process goes to the plan number 6 replenishment plan pattern shown in FIG. 15. Then, this replenishment plan pattern is processed.

First, using the second route replenishment point PR2c as the travel start point S, the CPU 24a obtains the first route replenishment point on the travel route P. The first route replenishment point has reached the travel end point E of the travel route P (see FIG. 15). Therefore, the CPU 24a adds the amount of travel time from the travel start point S (the second route replenishment point PR2c) to the travel end point E, i.e., the final travel time to the accumulated in-travel replenishment time; more specifically, a total in-travel replenishment time is calculated, and the travel start point S is taken as the travel end point E. Then, for the plan number 6 replenishment plan pattern, the memory 24b further stores the final travel time and the total in-travel replenishment time, and in addition, the operation that the travel start point S was made equal to the travel end point E, such that the plan number 6 replenishment plan pattern shown in FIG. 15 is complete.

Next, the replenishment plan pattern which is the current object to work on is plan number 6, which is equal to the number of replenishment plan patterns made so far, i.e., six.

Therefore, back to the plan number 1 replenishment plan pattern shown in FIG. 14, this replenishment plan pattern is taken as the object, to which the process described above is performed.

First, using the first route replenishment point PR1$b$ as the travel start point S, the CPU 24$a$ obtains the first route replenishment point on the travel route P. The first route replenishment point has reached the travel end point E of the travel route P (see FIG. 14). Therefore, the CPU 24$a$ adds the amount of travel time from the travel start point S (the first route replenishment point PR1$b$) to the travel end point E, i.e., the final travel time to the accumulated in-travel replenishment time; more specifically, a total in-travel replenishment time is calculated, and the travel start point S is taken as the travel end point E. Then, for the plan number 1 replenishment plan pattern, the memory 24$b$ further stores the final travel time and the total in-travel replenishment time, and in addition, the operation that the travel start point S was made equal to the travel end point E, such that the plan number 1 replenishment plan pattern shown in FIG. 14 is complete.

Next, the replenishment plan pattern which is the current object to work on is plan number 1, which is not equal to the number of replenishment plan patterns made so far, i.e., six. Therefore, the plan number is increased by an increment of one, and the process goes to the plan number 2 replenishment plan pattern shown in FIG. 16. Then, this replenishment plan pattern is processed.

First, using the first route replenishment point PR1$c$ as the travel start point S, the CPU 24$a$ obtains the first route replenishment point on the travel route P. The first route replenishment point has reached the travel end point E of the travel route P (see FIG. 16). Therefore, the CPU 24$a$ adds the amount of travel time from the travel start point S (the first route replenishment point PR1$c$) to the travel end point E, i.e., the final travel time to the accumulated in-travel replenishment time; more specifically, a total in-travel replenishment time is calculated, and the travel start point S is taken as the travel end point E. Then, for the plan number 2 replenishment plan pattern, the memory 24$b$ further stores the final travel time and the total in-travel replenishment time, and in addition, the operation that the travel start point S was made equal to the travel end point E, such that the plan number 2 replenishment plan pattern shown in FIG. 16 is complete.

Next, the replenishment plan pattern which is the current object to work on is plan number 2, which is not equal to the number of replenishment plan patterns made so far, i.e., six. Therefore, the plan number is increased by an increment of one, and the process goes to the plan number 3 replenishment plan pattern. However, in the plan number 3 replenishment plan pattern, the travel start point S is equal to the travel end point E, which means that the replenishment planning process is already finished. Therefore, the process ignores this replenishment plan pattern, and determines whether or not the travel start point S is equal to the travel end point E in all of the replenishment plan patterns 1 through 6. At this point, the travel start point S and the travel end point E are equal to each other in all of the replenishment plan patterns 1 through 6. Therefore, the plan number 5 replenishment plan pattern shown in FIG. 13, i.e., one which has the shortest total in-travel replenishment time in all of the replenishment plan patterns 1 through 6 is selected, and the process comes to an end.

According to the replenishment planning device 10 described above, after a process of calculating the first route replenishment point, the second route replenishment point, the first time, and the second time from the first travel start point S on the travel route P; then a process of taking the first route replenishment point and the second route replenishment point as the next travel start points S and calculating, for each, the next first route replenishment point, the next second route replenishment point, the next first time, and the next second time is repeated for each replenishment plan pattern until the first route replenishment point reaches the travel end point E. As a result, at least one replenishment plan pattern is made. The replenishment plan pattern includes position information which is based on the first route replenishment point and the second route replenishment point, and time information based on the first time and the second time, and it is possible to identify a position on the travel route P at which chemical replenishment becomes necessary based on the position information, and to identify a timing of the chemical replenishment based on the time information. The number of the replenishment plan patterns increases exponentially with base 2 unless any one of the first route replenishment points reaches the travel end point E. When the first route replenishment point reaches the travel end point E in any replenishment plan pattern, that replenishment plan pattern is finalized. Each of the obtained replenishment plan patterns in this way has a different combination of the first route replenishment point and the second route replenishment point, and accordingly has a different combination of the first time and the second time. In other words, various replenishment plan patterns are obtained. One of the obtained replenishment plan patterns is selected and notified, such that it becomes possible to identify in advance a position on the travel route at which the chemical replenishment will become necessary and a timing of the chemical replenishment, from that replenishment plan pattern. As a result, it is possible to easily make a replenishment plan of a chemical loaded in the unmanned helicopter 100.

It is possible to select a replenishment plan pattern which has a desired replenishment timing based on the time information.

By selecting a replenishment plan pattern having the shortest total time (total in-travel replenishment time) contained in the time information, it is possible to select a replenishment plan pattern which allows the unmanned helicopter 100 to travel from the first travel start point S on the travel route P to the travel end point E in the shortest amount of time.

A position on the replenishment line L which is closest from the first route replenishment point is calculated as the first replenishment point, and a position which is closest from the second route replenishment point is calculated as the second replenishment point. Therefore, it is possible to identify positions on the replenishment line L at which the chemical should be replenished and replenishment timings therefor, in advance for each replenishment plan pattern. Further, it is possible in each replenishment plan pattern to shorten an amount of travel time for the unmanned helicopter 100 to move between the travel route P and the first replenishment point and an amount of travel time to move between the travel route P and the second replenishment point for chemical replenishment, such that it is possible to shorten the first time and the second time. Therefore, it is possible in each replenishment plan pattern to shorten an amount of time for the unmanned helicopter 100 to move from the first travel start point S on the travel route P to the travel end point E.

The travel route P is a route composed of reciprocating movement in the first direction X and movement in the second direction Y which is perpendicular or substantially perpendicular to the first direction X. Since the replenishment line L extends parallel or substantially parallel to the second direction Y, it is possible to make the second route replenishment point at a position where the distance to the replenishment line L is shorter than in cases in which the replenishment line L extends parallel or substantially parallel to the first direction X.

It is possible to automatically move the unmanned helicopter 100 along the travel route P with an instruction from the input interface 26. This decreases a time difference between the calculated travel time from the travel start point S to the first route replenishment point obtained by the CPU 24a and an actual travel time when the movement is made automatically from the travel start point S to the first route replenishment point along the travel route P. This also decreases a time difference between the calculated travel time from the travel start point S to the second route replenishment point obtained by the CPU 24a and an actual travel time when the movement is made automatically from the travel start point S to the second route replenishment point along the travel route P. Therefore, it is possible to obtain a replenishment plan which is closer to the actual amount of chemical consumption.

The first route replenishment point is calculated based on the travel speed, the consumption route C, an amount of chemical load, and a chemical consumption rate. By taking the consumption route C into consideration when making the calculation, it is possible to obtain a replenishment plan which is closer to an actual amount of chemical consumption.

In the examples described above, one of the obtained replenishment plan patterns is notified. However, the present invention is not limited to this. A plurality (for example, all) of the obtained replenishment plan patterns may be notified. In this case, it becomes possible to select a desired replenishment plan pattern from the notified replenishment plan patterns, and to identify in advance positions on the travel route P at which the chemical replenishment is necessary and chemical replenishment timings therefor, from the selected replenishment plan pattern.

Also, fuel replenishment may be performed together with chemical replenishment at a chemical replenishment timing according to the above-described example.

The above-described functions and advantages are also offered by another example shown in FIG. 17 through FIG. 29 described below.

In the example shown in FIG. 4 through FIG. 16, the second route replenishment point is at a position on the travel route P which gives the smallest ratio of the distance from the second route replenishment point to the replenishment line L to the travel distance from the travel start point S to the second route replenishment point. Therefore, it is possible to make the second route replenishment point at which the travel distance from the travel start point S is increased and the distance to the replenishment line L is decreased.

In the example shown in FIG. 4 through FIG. 16, the amount of travel time for the unmanned helicopter 100 to move between the travel route P and the replenishment line L for chemical replenishment is the amount of time necessary to make a round trip between the first route replenishment point and the first replenishment point or between the second route replenishment point and the second replenishment point. Therefore, it is easy to set an amount of time to move between the travel route P and the replenishment line L.

The replenishment planning process of the chemical which is loaded in the unmanned helicopter 100 may also be performed as shown in FIG. 17 through FIG. 29.

The present example differs from the previous example shown in FIG. 4 through FIG. 16 in the second route replenishment point and the method for obtaining it. While the second route replenishment point PR2a in the present example and the second route replenishment point PR2a in the previous example are the same in that they are tracked back from the first route replenishment point PR1a along the travel route P, closer to the replenishment line L than the first route replenishment point PR1a is, and in that they have the same distance to the replenishment line L, the second route replenishment point PR2a in the present example is located at a position which is farther back on the travel route P than the second route replenishment point PR2a in the previous example is. In other words, the second route replenishment point PR2a in the present example and the second route replenishment point PR2a in the previous example have the same distance to the replenishment line L, but the second route replenishment point PR2a in the present example is located more upstream of the travel route P than the second route replenishment point PR2a in the previous example. The same applies to the second route replenishment points PR2b, PR2c.

Also, the present example and the previous example differ from each other in the second time and the method for obtaining it. In the present example, the second time is an amount of time necessary for the unmanned helicopter 100 to travel from the travel start point S to the second route replenishment point, to travel from the second route replenishment point to the second replenishment point, to replenish the chemical at the second replenishment point, and to move from the second replenishment point to the position which represents the second route replenishment point according to the previous example, based on the travel speed, the replenishment travel speed, and the replenishment time.

Further, the present example and the previous example differ from each other in the method for obtaining the next travel start point S. In the present example, the next travel start point S is not the second route replenishment point according to the present example but the position represented by the second route replenishment point according to the previous example. Resultingly, therefore, the next travel start point S according to the present example is equal to the one in the previous example.

As described above, the present example and the previous example differ from each other in the second route replenishment point and the second time, and accordingly, the two examples differ in their second replenishment point, and in addition, the two examples may differ in final travel time, in-travel replenishment time, total in-travel replenishment time, position information, time information, and replenishment due time.

In the other aspects, the present example and the previous example are the same, and the present example will be understood easily by reading the description of the previous example while replacing FIG. 4 through FIG. 16 with FIG. 17 through FIG. 29 respectively; therefore, no such duplicate description will be made herein.

The second route replenishment point in the present example is at a position on the travel route P from which a distance to the replenishment line L is identical with the distance from the second route replenishment point in the previous example to the replenishment line L. Therefore, it is possible to make the second route replenishment point at a position where the distance to the replenishment line L is decreased.

It should be noted here that in the chemical replenishment planning process, calculation of the first route replenishment point may be based on the travel speed, the amount of chemical load, and the chemical consumption rate without taking the consumption route C into consideration.

Also, preferred embodiments of the present invention may be applied to fuel replenishment planning, with the consumable material being the fuel stored in the fuel tank 64 of the unmanned helicopter 100. In this case, the memory 24b further stores an amount of the fuel loaded in the fuel tank 64, and a fuel consumption rate indicating an amount of the fuel consumption per unit time at a given travel speed. Also, the memory 24b stores a replenishment area for fuel replenishment if the replenishment area is different from a replenishment area for chemical replenishment; and a replenishment time necessary for the fuel replenishment at the replenishment area if the replenishment time is different from a replenishment time necessary for chemical replenishment at the replenishment area.

Then, when the unmanned helicopter 100 moves from the travel start point S along the travel route P, the first route replenishment point is obtained based on the travel speed, the amount of fuel load, and the fuel consumption rate of the unmanned helicopter 100 at which it moves along the travel route P without taking the consumption route C into consideration. Since the fuel replenishment requires travel from the first route replenishment point to the first replenishment point, the first route replenishment point is obtained as a point on the travel route P at which there is still an amount of fuel necessary for that travel.

The other arrangements are the same as for the chemical replenishment planning process, and therefore the present preferred embodiment will be understood easily by reading the above description of the chemical replenishment planning process with reference to FIG. 3 while replacing the term "chemical" with "fuel". The above-described preferred embodiments offer the same advantages as in the case in which the consumable material is a chemical.

Additionally, in selecting the chemical replenishment plan pattern in the description made above, a replenishment plan pattern which has the shortest total time (total in-travel replenishment time) is selected. When selecting a fuel replenishment plan pattern, selection may be made for a replenishment plan pattern which has the shortest total time (total in-travel replenishment time) or a replenishment plan pattern which gives the smallest amount of total fuel consumption.

The fuel replenishment plan is suitable to cases in which the unmanned helicopter 100 is mounted with a camera for taking views. Also, the fuel replenishment timing may be utilized to replenish a chemical together with the fuel.

The processes described above may be utilized to create a replenishment plan for both chemicals and fuel. In this case, replenishment timings may be individual or simultaneous. As described above, preferred embodiments of the present invention can be utilized to plan replenishment of a plurality of consumable materials.

Also, the consumable material may be any application material other than a chemical, such as fertilizer and seeds.

In the preferred embodiments described above, the selected replenishment plan pattern is notified by being displaying on the display 28. However, the present invention is not limited to this. The replenishment plan pattern may be notified by audio output.

In the preferred embodiments described above, description was made for a case in which the replenishment plan pattern is created before a flight of the unmanned helicopter 100. However, the present invention is not limited to this. It is also possible to update (revise) the replenishment plan pattern while the unmanned helicopter 100 is in flight. In this case, replenishment plan patterns are newly created for travel of the unmanned helicopter 100 from an in-flight point on the travel route P to the travel end point E.

In the preferred embodiments described above, description was made for a case in which the unmanned helicopter 100 makes a flight over a rectangular application area 68 such as a crop field. However, the present invention is not limited to this. The unmanned helicopter 100 may fly over an area of any topological characteristics such as hills.

In the preferred embodiments described above, description was made for a case in which the replenishment area is a straight replenishment line L. However, the present invention is not limited to this. The replenishment area may be one or a plurality of point-like replenishment points, or may be a surface-like replenishment area.

In the preferred embodiments described above, the travel route P of the unmanned helicopter 100 is a reciprocating route. However, the present invention is not limited to this. The travel route may be a spiral route.

For example, there may be a case in which the application area is circular, at the center of which there is a point-like replenishment point so that the unmanned helicopter 100 makes a spiral flight from the replenishment point.

In cases in which the first route replenishment point and the second route replenishment point are generally the same place, the second route replenishment point may be neglected (not stored) in order to reduce the amount of calculations.

In the preferred embodiments described above, description was made for a case in which the unmanned helicopter 100 is driven by an engine 62. However, the present invention is not limited to this. The unmanned helicopter may be driven by a motor. In this case, the present invention is applied to a battery charging plan for the motor, and the consumable material is electric power charged in the battery.

In the preferred embodiments described above, the present invention is utilized for a flight of an unmanned helicopter. However, the present invention is not limited to this. The present invention is applicable for a flight of any unmanned aircraft such as a multicopter. Further, the present invention is also applicable to cases in which any moving body other than an unmanned aircraft is moved on the ground, on or under water.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A replenishment planning device for planning replenishment of a consumable material loaded in and consumed by a moving body as the moving body travels, the replenishment planning device comprising:
    a storage to store a travel route of the moving body including a travel start point and a travel end point, a travel speed at which the moving body travels along the travel route, a load amount of the consumable material, a consumption rate indicating an amount of consumption of the consumable material per unit time, a replenishment area to replenish the consumable material, a replenishment travel speed at which the moving body moves between the travel route and the replenishment area, and a replenishment time necessary to replenish the consumable material at the replenishment area;

a first calculator to calculate, based on the travel speed, the load amount and the consumption rate, a first route replenishment point on the travel route at which replenishment of the consumable material becomes necessary when the moving body travels from the travel start point along the travel route;

a second calculator to calculate a second route replenishment point on the travel route obtained by tracking back from the first route replenishment point along the travel route to a location that is closer to the replenishment area than the first route replenishment point;

a third calculator to calculate, based on the travel speed, the replenishment travel speed and the replenishment time, a first time necessary for the moving body to move from the travel start point to the first route replenishment point, move from the first route replenishment point to the replenishment area, have the consumable material replenished at the replenishment area, and move from the replenishment area to the travel route;

a fourth calculator to calculate, based on the travel speed, the replenishment travel speed, and the replenishment time, a second time necessary for the moving body to move from the travel start point to the second route replenishment point, move from the second route replenishment point to the replenishment area, have the consumable material replenished at the replenishment area, and move from the replenishment area to the travel route; and a notifier to notify at least one replenishment plan pattern which includes position information based on the first route replenishment point and the second route replenishment point, and time information based on the first time and the second time; wherein the replenishment planning device generates the position information and the time information for each of the at least one replenishment plan pattern by having the first calculator through the fourth calculator calculate the first route replenishment point, the second route replenishment point, the first time and the second time; and thereafter repeating the process of taking the first route replenishment point, and the second route replenishment point or a point on the travel route between the first route replenishment point and the second route replenishment point, as next travel start points, and for each of which having the first calculator through the fourth calculator calculate a next first route replenishment point, a next second route replenishment point, a next first time, and a next second time until the first route replenishment point reaches the travel end point in each of the at least one replenishment plan pattern.

2. The replenishment planning device according to claim 1, further comprising a selector to select the replenishment plan pattern to be notified based on the time information.

3. The replenishment planning device according to claim 2, further comprising:

a fifth calculator to calculate, for each of the at least one replenishment plan pattern when the first route replenishment point reaches the travel end point, a total time of final travel time from an immediately previous first route replenishment point or an immediately previous second route replenishment point through the travel end point, all the first times and all the second times; wherein the selector selects the replenishment plan pattern which has a shortest total time in the time information.

4. The replenishment planning device according to claim 1, further comprising:

a sixth calculator to calculate a position in the replenishment area which is closest from the first route replenishment point as a first replenishment point; and a seventh calculator to calculate a position in the replenishment area which is closest from the second route replenishment point as a second replenishment point.

5. The replenishment planning device according to claim 4, wherein the first time calculated by the third calculator is an amount of time necessary for the moving body to move from the travel start point to the first route replenishment point, make a round trip between the first route replenishment point and the first replenishment point, and obtain the consumable material replenished at the first replenishment point; and the second time calculated by the fourth calculator is an amount of time necessary for the moving body to move from the travel start point to the second route replenishment point, make a round trip between the second route replenishment point and the second replenishment point, and obtain the consumable material replenished at the second replenishment point.

6. The replenishment planning device according to claim 1, wherein the second route replenishment point is also a first position on the travel route at which a ratio of a distance to the replenishment area to a travel distance from the travel start point is smallest, or is a second position on the travel route from which a distance to the replenishment area is equal to a distance from the first position to the replenishment area.

7. The replenishment planning device according to claim 6, wherein the second route replenishment point is a position on the travel route at which a ratio of a distance to the replenishment area to a travel distance from the travel start point is smallest.

8. The replenishment planning device according to claim 1, wherein the travel route includes a route made of reciprocating traveling in a first direction and traveling in a second direction perpendicular or substantially perpendicular to the first direction; and the replenishment area includes a replenishment line extending parallel or substantially parallel to the second direction.

9. The replenishment planning device according to claim 1, wherein the moving body travels automatically along the travel route.

10. The replenishment planning device according to claim 1, wherein the consumable material is an application material.

11. The replenishment planning device according to claim 10, wherein the storage further stores a consumption route in the travel route along which the application material is consumed; and the first calculator calculates the first route replenishment point based on the travel speed, the consumption route, the load amount, and the consumption rate.

12. The replenishment planning device according to claim 1, wherein the moving body is an unmanned aircraft.

13. A replenishment planning method for planning replenishment of a consumable material loaded in and consumed by a moving body as the moving body travels, the replenishment planning method being based on a travel route of the moving body including a travel start point and a travel end point, a travel speed at which the moving body travels along the travel route, a load amount of the consumable material, a consumption rate indicating an amount of consumption of the consumable material per unit time, a replenishment area to replenish the consumable material, a replenishment travel speed at which the moving body moves between the travel route and the replenishment area, and a replenishment time necessary to replenish the consumable material at the replenishment area, the method comprising:

calculating, based on the travel speed, the load amount, and the consumption rate, a first route replenishment point on the travel route at which replenishment of the consumable material becomes necessary when the moving body travels from the travel start point along the travel route;

calculating a second route replenishment point on the travel route obtained by tracking back from the first route replenishment point along the travel route to a location that is closer to the replenishment area than the first route replenishment point;

calculating, based on the travel speed, the replenishment travel speed, and the replenishment time, a first time necessary for the moving body to move from the travel start point to the first route replenishment point, move from the first route replenishment point to the replenishment area, have the consumable material replenished at the replenishment area, and move from the replenishment area to the travel route;

calculating, based on the travel speed, the replenishment travel speed, and the replenishment time, a second time necessary for the moving body to move from the travel start point to the second route replenishment point, move from the second route replenishment point to the replenishment area, have the consumable material replenished at the replenishment area, and move from the replenishment area to the travel route;

taking the first route replenishment point, and the second route replenishment point or a point on the travel route between the first route replenishment point and the second route replenishment point, as next travel start points; and notifying at least one replenishment plan pattern which includes position information based on the first route replenishment point and the second route replenishment point, and time information based on the first time and the second time; wherein the method generates the position information and the time information for each of the at least one replenishment plan pattern by executing each of the calculating steps to calculate the first route replenishment point, the second route replenishment point, the first time, and the second time, and thereafter repeating the process of executing the taking step to take the first route replenishment point, and the second route replenishment point or the point on the travel route between the first route replenishment point and the second route replenishment point, as next travel start points, and for each of which executing the calculating steps to calculate a next first route replenishment point, a next second route replenishment point, a next first time, and a next second time until the first route replenishment point reaches the travel end point in each of the at least one replenishment plan pattern; and then executes the notifying step to notify the at least one replenishment plan pattern.

* * * * *